US012694293B1

(12) United States Patent
Pourashraf

(10) Patent No.: US 12,694,293 B1
(45) Date of Patent: Jul. 28, 2026

(54) COMPUTING SYSTEM AND METHOD FOR FAIRNESS-AWARE QUANTIZATION OF DEEP-LEARNING AI MODELS

(71) Applicant: Capital One Services, LLC, McLean, VA (US)

(72) Inventor: Payam Pourashraf, Arlington Heights, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/364,949

(22) Filed: Oct. 21, 2025

(51) Int. Cl.
    *G06N 3/08* (2023.01)
(52) U.S. Cl.
    CPC ...................................... *G06N 3/08* (2013.01)
(58) Field of Classification Search
    None
    See application file for complete search history.

(56) References Cited

U.S. PATENT DOCUMENTS

| | | | |
|---|---|---|---|
| 10,977,729 B2 | 4/2021 | Kamkar et al. | |
| 2023/0401059 A1* | 12/2023 | Alidori ............... | G06F 9/30043 |
| 2024/0305785 A1* | 9/2024 | Van Rozendaal .... | H04N 19/176 |
| 2025/0217446 A1* | 7/2025 | Xu ........................ | G06N 3/0985 |
| 2025/0363365 A1* | 11/2025 | Galvin ................... | G06N 3/082 |

OTHER PUBLICATIONS

Dettmers et al., QLORA: Efficient Finetuning of Quantized LLMs; 37th Conference on Neural Information Processing Systems (NeurIPS 2023); pp. 1-28 (Year: 2023).*
Hooker et al., Characterising Bias in Compressed Models; arXiv:2010.03058v2 [cs.LG] Dec. 18, 2020; pp. 1-13 (Year: 2020).*
Kozodoi et al., Fairness in Credit Scoring: Assessment, Implementation and Profit Implications; arXiv:2103.01907v4 [stat.ML] Jun. 17, 2022; pp. 1-24 (Year: 2022).*
Guo, Yuanbo et al. "FairQuantize: Achieving Fairness Through Weight Quantization for Dermatological Disease Diagnosis", MIC-CAI, Oct. 2024, 10 pages.
Bartz, Diane. As ChatGPT's Popularity Explodes, U.S. Lawmakers Take an Interest. Reuters. Feb. 13, 2023. 12 Pages [online], [retrieved on Jul. 15, 2025]. Retrieved from the Internet <URL: https://www.reuters.com/technology/chatgpts-popularity-explodes-us-lawmakers-take-an-interest-2023-02-13/>.

(Continued)

*Primary Examiner* — Alan Chen
(74) *Attorney, Agent, or Firm* — Lee Sullivan Shea & Smith LLP

(57) ABSTRACT

Disclosed herein is a computing platform configured to (i) for a deep-learning AI model, determine a respective fairness-importance score of a respective parameter for at least a subset of the deep-learning AI model's parameters that quantifies how much the respective parameter influences generating fair predictions across a plurality of demographic groups, (ii) carry out an optimization process that produces and evaluates different quantized versions of the deep-learning AI model, (iii) based on the optimization process, select a given quantized version of the deep-learning AI model for deployment, (iv) fine-tune the given quantized version of the deep-learning AI model, and after fine-tuning the given quantized version of the deep-learning AI model, deploying the given quantized version of the deep-learning AI model.

20 Claims, 9 Drawing Sheets

(56) References Cited

OTHER PUBLICATIONS

Bowman, Samuel R. Eight Things to Know about Large Language Models. arXiv:2304.00612v1. Apr. 2, 2023. 16 Pages [online], [retrieved on Jul. 15, 2025]. Retrieved from the Internet <URL: https://doi.org/10.48550/arXiv.2304.00612>.

Chughtai, Bilal et al. A Toy Model of Universality: Reverse Engineering How Networks Learn Group Operations. arXiv:2302.03025. Feb. 6, 2023. 22 Pages [online], [retrieved on Jul. 15, 2025]. Retrieved from the Internet <URL: https://arxiv.org/pdf/2302.03025v1>.

Conmy, Arthur et al. Towards Automated Circuit Discovery for Mechanistic Interpretability. Advances in Neural Information Processing Systems. Dec. 10, 2023. pp. 16318-16352 [online], [retrieved on Jul. 15, 2025]. Retrieved from the Internet <URL: https://proceedings.neurips.cc/paper_files/paper/2023/file/34e1dbe95d34d7ebaf99b9bcaeb5b2be-Paper-Conference.pdf>.

Consumer Financial Protection Bureau (CFPB). Unfair, Deceptive, or Abusive Acts or Practices. Oct. 2012. 18 Pages [online], [retrieved on Sep. 4, 2025]. Retrieved from the Internet <URL: https://files.consumerfinance.gov/f/documents/cfpb_unfair-deceptive-abusive-acts-practices-udaaps_procedures_2023-09.pdf>.

Douglas, Michael R. Large Language Models. arXiv:2307.05782v1. Jul. 11, 2023. 46 Pages [online], [retrieved on Jul. 15, 2025]. Retrieved from the Internet <URL: https://arxiv.org/pdf/2307.05782v1>.

Elhage, Nelson et al. A Mathematical Framework for Transformer Circuits. Transformer Circuits Thread. Dec. 22, 2021. 50 Pages [online], [retrieved on Jul. 15, 2025]. Retrieved from the Internet <URL: https://transformer-circuits.pub/2021/framework/index.html>.

Federal Communications Commission (FCC). Telephone Consumer Protection Act. 1991. 13 Pages [online], [retrieved on Sep. 4, 2025]. Retrieved from the Internet <URL: https://www.fcc.gov/sites/default/files/tcpa-rules.pdf>.

Federal Deposit Insurance Corporation (FDIC). Military Lending Act. 2006. 17 Pages [online], [retrieved on Sep. 4, 2025]. Retrieved from the Internet <URL: https://www.fdic.gov/resources/supervision-and-examinations/consumer-compliance-examination-manual/documents/5/v-13-1.pdf>.

Gurnee, Wes et al. Universal Neurons in GPT2 Language Models. arXiv:2401.12181. Jan. 22, 2024. 33 Pages [online], [retrieved on Jul. 15, 2025]. Retrieved from the Internet <URL: https://doi.org/10.48550/arXiv.2401.12181>.

Huang, Yufei et al. Unified View of Grokking, Double Descent and Emergent Abilities: A Perspective from Circuits Competition. arXiv:2402.15175. Feb. 26, 2024. 13 Pages [online], [retrieved on Jul. 15, 2025]. Retrieved from the Internet <URL: https://doi.org/10.48550/arXiv.2402.15175>.

Klein, Ezra. This Changes Everything. New York Times. Mar. 12, 2023. 6 Pages [online], [retrieved on Jul. 15, 2025]. Retrieved from the Internet <URL: https://www.nytimes.com/2023/03/12/opinion/chatbots-artificial-intelligence-future-weirdness.html>.

Li, Yinheng et al. Large Language Models in Finance: A Survey. In Proceedings of the Fourth ACM International Conference on AI in Finance. Nov. 27-29, 2023. pp. 374-382 [online], [retrieved on Jul. 15, 2025]. Retrieved from the Internet <URL: https://doi.org/10.1145/3604237.3626869>.

Lieu, Ted. I'm a Congressman Who Codes. A.I. Freaks Me Out. New York Times. Jan. 23, 2023. 4 Pages [online], [retrieved on Jul. 15, 2025]. Retrieved from the Internet <URL: https://www.nytimes.com/2023/01/23/opinion/ted-lieu-ai-chatgpt-congress.html>.

Liu, Xiao-Yang et al. Data-Centric FinGPT: Democratizing Internet-Scale Data for Financial Large Language Models. NeurIPS Workshop on Instruction Tuning and Instruction Following. Nov. 14, 2023. 43 Pages [online], [retrieved on Jul. 15, 2025]. Retrieved from the Internet <URL: https://arxiv.org/pdf/2307.10485>.

McDougall, Callum. ARENA (Alignment Research Engineer Accelerator) 3.0. Source. 2024. 9 Pages [online], [retrieved on Sep. 4, 2025]. Retrieved from the Internet <URL: https://arena3-chapter1-transformer-interp.streamlit.app/>.

Meng, Kevin et al. Locating and Editing Factual Associations in GPT. Advances in Neural Information Processing Systems 35. 2022. pp. 17359-17372 [online], [retrieved on Jul. 15, 2025]. Retrieved from the Internet <URL: https://proceedings.neurips.cc/paper_files/paper/2022/file/6f1d43d5a82a37e89b0665b33bf3a182-Paper-Conference.pdf>.

Minaee, Shervin et al. Large Language Models: A Survey. arXiv e-prints, p. arXiv:2402.06196v2. Feb. 20, 2024. 42 Pages [online], [retrieved on Sep. 4, 2025]. Retrieved from the Internet <URL: https://doi.org/10.48550/arXiv.2402.06196>.

Nanda, Neel et al. Progress Measures for Grokking Via Mechanistic Interpretability. arXiv:2301.05217. Jan. 13, 2023. 36 Pages [online], [retrieved on Sep. 4, 2025]. Retrieved from the Internet <URL: https://doi.org/10.48550/arXiv.2301.05217>.

Nanda, Neel et al. TransformerLens. GitHub. 2022. 6 Pages [online], [retrieved on Sep. 4, 2025]. Retrieved from the Internet <URL: https://github.com/neelnanda-io/TransformerLens>.

Nanda, Neel. A Comprehensive Mechanistic Interpretability Explainer & Glossary. TransformerLens Library for Mechanistic Interpretability of Language Models. Dec. 2022. 66 Pages [online], [retrieved on Sep. 4, 2025]. Retrieved from the Internet <URL: https://neelnanda.io/glossary>.

Nanda, Neel. Mechanistic Interpretability Quickstart Guide. LessWrong. Jan. 2023. 6 Pages [online], [retrieved on Sep. 4, 2025]. Retrieved from the Internet <URL: https://www.lesswrong.com/posts/jLAvJt8wuSFySN975/mechanistic-interpretability-quickstart-guide>.

Olah, Chris et al. Zoom In: An Introduction to Circuits. Distill. Mar. 10, 2020. 29 Pages [online], [retrieved on Sep. 4, 2025]. Retrieved from the Internet <URL: https://distill.pub/2020/circuits/zoom-in>.

Olah, Chris. Mechanistic Interpretability, Variables, and the Importance of Interpretable Bases. Transformer Circuits Thread. Jun. 27, 2022. 8 Pages [online], [retrieved on Sep. 4, 2025]. Retrieved from the Internet <URL: https://www.transformer-circuits.pub/2022/mech-interp-essay>.

Olsson, Catherine et al. In-Context Learning and Induction Heads. Transformer Circuits Thread. Mar. 8, 2022. 67 Pages [online], [retrieved on Sep. 4, 2025]. Retrieved from the Internet <URL: https://transformer-circuits.pub/2022/in-context-learning-and-induction-heads/index.html>.

Park, S. Real-World Examples of Domain-Specific LLMs: Bring Tailored AI to Your Business. Upstage. Feb. 19, 2024. 11 Pages [online], [retrieved on Sep. 10, 2025]. Retrieved from the Internet <URL: https://www.upstage.ai/blog/en/examples-of-domain-specific-llms>.

Penke, Carolin. A Mathematician's Introduction to Transformers and Large Language Models. JSC Accelerating Devices Lab. Jul. 13, 2022. 13 Pages [online], [retrieved on Sep. 4, 2025]. Retrieved from the Internet <URL: https://doi.org/10.34732/xdvblg-qsbtyx>.

Phuong, Mary. Formal Algorithms for Transformers. arXiv e-prints, arXiv:2207.09238v1. Jul. 19, 2022. 16 Pages [online], [retrieved on Sep. 4, 2025]. Retrieved from the Internet <URL: https://doi.org/10.48550/arXiv.2207.09238>.

Radford, Alec et al. Language Models are Unsupervised Multitask Learners. OpenAI Blog. 2019. 24 Pages [online], [retrieved on Sep. 4, 2025]. Retrieved from the Internet <URL: https://cdn.openai.com/better-language-models/language_models_are_unsupervised_multitask_learners.pdf>.

Templeton, Adly et al. Scaling Monosemanticity: Extracting Interpretable Features from Claude 3 Sonnet. Transformer Circuits Thread. May 21, 2024. 76 Pages [online], [retrieved on Sep. 4, 2025]. Retrieved from the Internet <URL: https://transformer-circuits.pub/2024/scaling-monosemanticity/>.

U.S. Department of Justice (DoJ). Equal Credit Opportunity Act. 2011. 19 Pages [online], [retrieved on Sep. 4, 2025]. Retrieved from the Internet <URL: https://www.govinfo.gov/content/pkg/USCODE-2011-title15/html/USCODE-2011-title15-chap41-subchapIV.htm>.

U.S. Department of Justice (DoJ). Fair Housing Act 1968. Updated Jun. 22, 2023. 6 Pages [online], [retrieved on Sep. 4, 2025]. Retrieved from the Internet <URL: https://www.justice.gov/crt/fair-housing-act-1>.

(56)     References Cited

OTHER PUBLICATIONS

U.S. Department of Justice (DoJ). Servicemembers Civil Relief Act 1940. Updated Dec. 13, 2021. 2 Pages [online], [retrieved on Sep. 4, 2025]. Retrieved from the Internet <URL: https://www.justice.gov/crt/servicemembers-civil-relief-act-summary>.

Vaswani, Ashish et al. Attention is All You Need. Advances in Neural Information Processing Systems, vol. 30. Dec. 6, 2017. 15 Pages [online], [retrieved on Sep. 4, 2025]. Retrieved from the Internet <URL: https://doi.org/10.48550/arXiv.1706.03762>.

Wang, Kevin R. et al. Interpretability in the Wild: a Circuit for Indirect Object Identification in GPT-2 Small. In NeurIPS ML Safety Workshop. Nov. 1, 2022. 25 Pages [online], [retrieved on Sep. 4, 2025]. Retrieved from the Internet <URL: https://doi.org/10.48550/arXiv.2211.00593>.

Wang, Kevin R. et al. Redwood Research Easy-Transformer. GitHub. 2022. 4 Pages [online], [retrieved on Sep. 4, 2025]. Retrieved from the Internet <URL: https://github.com/redwoodresearch/Easy-Transformer/>.

Wu, Shijie et al. BloombergGPT: A Large Language Model for Finance. arXiv e-prints, p. arXiv:2303.17564. Mar. 30, 2023. 65 Pages [online], [retrieved on Sep. 4, 2025]. Retrieved from the Internet <URL: https://doi.org/10.48550/arXiv.2303.17564>.

Zhao, Haiyan et al. Towards Uncovering How Large Language Model Works: An Explainability Perspective. arXiv e-prints, p. arXiv:2402.10688. Feb. 16, 2024. 11 Pages [online], [retrieved on Sep. 4, 2025]. Retrieved from the Internet <URL: https://doi.org/10.48550/arXiv.2402.10688>.

* cited by examiner

500

| FOR A DEEP-LEARNING AI MODEL, DETERMINE A RESPECTIVE FAIRNESS-IMPORTANCE SCORE OF A RESPECTIVE PARAMETER FOR AT LEAST A SUBSET OF THE DEEP-LEARNING AI MODEL'S PARAMETERS THAT QUANTIFIES HOW MUCH THE RESPECTIVE PARAMETER INFLUENCES GENERATING FAIR PREDICTIONS ACROSS A PLURALITY OF DEMOGRAPHIC GROUPS | 502 |

↓

| CARRY OUT AN OPTIMIZATION PROCESS | 504 |

↓

| BASED ON THE OPTIMIZATION PROCESS, SELECT A GIVEN QUANTIZED VERSION OF THE DEEP-LEARNING AI MODEL FOR DEPLOYMENT | 506 |

↓

| FINE-TUNE THE GIVEN QUANTIZED VERSION OF THE DEEP-LEARNING AI MODEL | 508 |

↓

| AFTER FINE-TUNING THE GIVEN QUANTIZED VERSION OF THE DEEP-LEARNING AI MODEL, DEPLOY THE GIVEN QUANTIZED VERSION OF THE DEEP-LEARNING AI MODEL | 510 |

FIG. 5

COMPUTING SYSTEM AND METHOD FOR FAIRNESS-AWARE QUANTIZATION OF DEEP-LEARNING AI MODELS

BACKGROUND

One key aspect of most data platforms today is the use of artificial intelligence (AI) models to perform certain tasks related to an organization's business. The AI models that are utilized could take any of various forms, and one emerging type of AI models are large language models (LLMs), which is a sub-category of "deep-learning" AI models that are based on neural networks. At a high level, an LLM is a type of AI model that is configured to understand the meaning of text (e.g., words, phrases, context, etc.) in one or more languages (e.g., natural languages, programming languages, etc.) and to generate meaningful text in such languages in response to input. For instance, an LLM may receive input in the form of a prompt (e.g., text provided by a user in one or more languages) and generate a response to the prompt (e.g., in the one or more languages). In general, LLMs are developed by applying machine-learning processes to vast sets of training data that comprise text written in one or more languages.

OVERVIEW

Disclosed herein is new software technology for creating, deploying, and monitoring a fairness-aware quantized version of a deep-learning AI model.

In one aspect, the disclosed technology may take the form of a method to be carried out by a computing platform that involves (i) for a deep-learning AI model, determining a respective fairness-importance score of a respective parameter for at least a subset of the deep-learning AI model's parameters that quantifies how much the respective parameter influences generating fair predictions across a plurality of demographic groups, (ii) carrying out an optimization process that produces and evaluates different quantized versions of the deep-learning AI model that each differ from one another with respect to one or both of (a) which group of the deep-learning AI model's parameters had their precision frozen during quantization, wherein the group of the deep-learning AI model's parameters had their precision frozen during quantization is determined based on the fairness-importance scores, and (b) which quantization strategy was utilized to reduce a precision of the deep-learning AI model's parameters that did not have their precision frozen during quantization, (iii) based on the optimization process, selecting a given quantized version of the deep-learning AI model for deployment, (iv) fine-tuning the given quantized version of the deep-learning AI model, and (v) after fine-tuning the given quantized version of the deep-learning AI model, deploying the given quantized version of the deep-learning AI model.

In some example implementations, the method may further involve receiving data defining configuration settings that are input via a given client device associated with a user, wherein the configuration settings define strategies for one or more of (i) carrying out the optimization process, or (ii) fine-tuning the given quantized version of the deep-learning AI model.

In some example implementations, the configuration settings may comprise one or more of (i) group-level fairness settings that comprise constraints for maintaining a given fairness metric above a given threshold for each of the plurality of demographic groups, (ii) fairness-analysis settings for establishing baseline fairness metrics for each of the plurality of demographic groups, (iii) quantization settings, or (iv) fine-tuning settings.

Further, in some example implementations, determining a respective fairness-importance score of a respective parameter for at least the subset of the deep-learning AI model's parameters may comprise (i) loading a group-stratified dataset that is partitioned based on demographic attributes, (ii) based on the group-stratified dataset, determining one or more baseline fairness metrics for each of the plurality of demographic groups, wherein the one or more baseline fairness metrics comprises one or more of a true positive prediction rate, false positive prediction rate, or a false negative prediction rate, (iii) for each of the plurality of demographic groups, determining a difference between a given baseline fairness metric and a corresponding fairness metric for the demographic group when the respective parameter is perturbed, and (iv) determining a maximum absolute difference in fairness metrics between any two of the plurality of demographic groups.

Further yet, in some example implementations, the different quantized versions of the deep-learning AI model that are produced and evaluated comprises a first quantized version of the deep-learning AI model, and a second quantized version of the deep-learning AI model, and selecting the given quantized version of the deep-learning AI model for deployment may comprise (i) determining whether the first quantized version of the deep-learning AI model satisfies a set of one or more optimization constraints that is applicable to any quantized version of the deep-learning AI model, (ii) based on the determination that the first quantized version of the deep-learning AI model satisfies the set of one or more optimization constraints, determining an objective value for the first quantized version of the deep-learning AI model, (iii) determining whether the second quantized version of the deep-learning AI model satisfies the set of one or more optimization constraints, (iv) based on the determination that second quantized version of the deep-learning AI model satisfies the set of one or more optimization constraints, (a) determining an objective value for the second quantized version of the deep-learning AI model, (b) comparing the objective value for the first quantized version of the deep-learning AI model with the objective value for the second quantized version of the deep-learning AI model, and (c) based on the comparison, retaining one of the first or second quantized version of the deep-learning AI model with a better objective value and discarding the other, where the objective value for each quantized version of the deep-learning AI model is determined based at least on (1) a prediction error of the quantized version of the deep-learning AI model, (2) a fairness error of the quantized version of the deep-learning AI model, and (3) a fairness-balancing coefficient applied to the fairness error.

In some example implementations, the set of one or more optimization constraints for any quantized version of the deep-learning AI model comprises a model size constraint, a predictive accuracy constraint, or a prediction time constraint.

In some example implementations, selecting the given quantized version of the deep-learning AI model for deployment may further comprise, based on the determination that the second quantized version of the deep-learning AI model does not satisfy the set of one or more optimization constraints, discarding the second quantized version of the deep-learning AI model.

Further, in some example implementations, fine-tuning the given quantized version of the deep-learning AI model may comprise applying a Low-Rank Adaptation (LoRA) technique to fine-tune the given quantized version of the deep-learning AI model.

In some example implementations, applying the LoRA technique to fine-tune the given quantized version of the deep-learning AI model may comprise (i) inserting one or more low-rank matrices into selected layers of the given quantized version of the deep-learning AI model, and (ii) updating the one or more low-rank matrices while keeping quantized parameters of the given quantized version of the deep-learning AI model frozen to minimize an overall loss function comprising (a) a task loss component that measures predictive accuracy of the given quantized version of the deep-learning AI model, (b) a penalty loss component that measures the extent to which the given quantized version of the deep-learning AI model violates fairness objectives aimed at reducing disparities across the plurality demographic groups, and (c) a penalty coefficient applied to the penalty loss component.

Further, in some example implementations, the deep-learning AI model may be configured to generate predictions related to whether a financial institution should extend a particular type of service to individuals from the plurality of demographic groups, where the particular type of service comprises one of a loan, a credit card account, a bank account, or a mortgage service.

Further yet, in some example implementations, the method may further involve, after deploying the given quantized version of the deep-learning AI model, determining one or more fairness metrics for each of the plurality of demographic groups based on predictions output by the given quantized version of the deep-learning AI model.

In some example implementations, the method may further involve generating an alert if a given fairness metric determined for a given demographic group in the plurality of demographic groups violates a predefined threshold.

In another aspect, the disclosed technology may take the form of a computing platform comprising at least one processor, at least one non-transitory computer-readable medium, and program instructions stored on the at least one non-transitory computer-readable medium that, when executed by the at least one processor, cause the computing platform to carry out the functions of the aforementioned method.

In yet another aspect, the disclosed technology may take the form of a non-transitory computer-readable medium comprising program instructions stored thereon that are executable to cause a computing platform to carry out the functions of the aforementioned method.

One of ordinary skill in the art will appreciate these as well as numerous other aspects in reading the following disclosure.

BRIEF DESCRIPTION OF THE DRAWINGS

FIG. 5 illustrates an example functional block diagram of an example process that may be carried out in accordance with the present disclosure.

Figure 1:
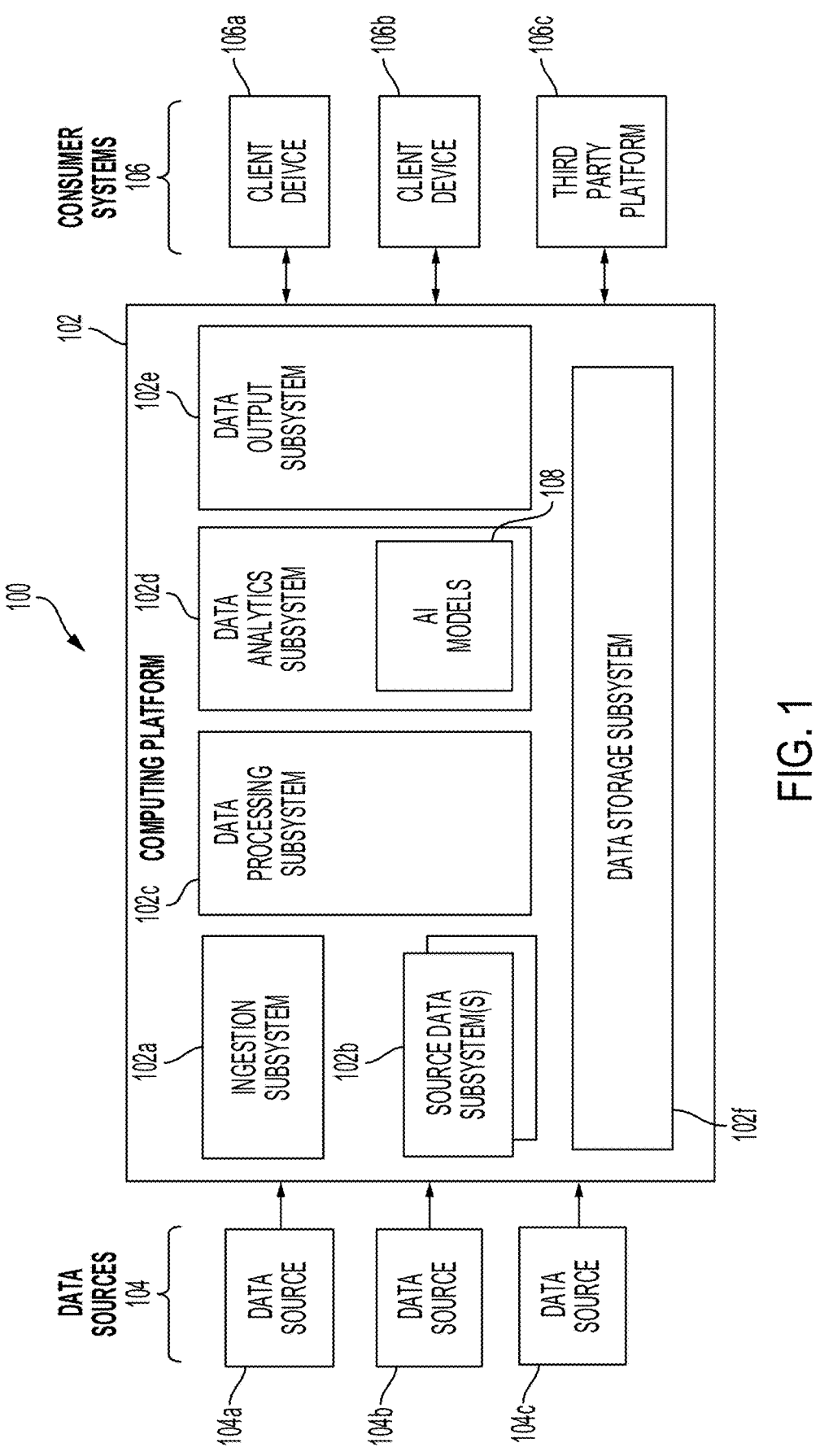
FIG. 1 is a simplified block diagram illustrating an example network environment in which an artificial intelligence (AI) model may be trained and/or executed.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

Organizations in many different industries have begun to operate computing platforms that are configured to ingest, process, analyze, generate, store, and/or output data that is relevant to the businesses of those organizations, which are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IOT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, etc.), customer identification data (e.g., name, address, social security number, etc.), customer interaction data (e.g., web-based interactions with the financial institution such as logins), and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or client devices of customers (e.g., personal computers, mobile phones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For instance, in line with the present disclosure, data analytics subsystem 102d may be configured to utilize artificial intelligence (AI) models 108 for performing certain types of tasks related to the organization's business. In this respect, the AI models 108 that are utilized by the example computing platform 102 may be hosted either on the example computing platform 102 itself or on a remote computing platform that is accessible over one or more data networks (e.g., via an Application Programming Interface (API)), among other possibilities.

Referring again to FIG. 1, the example computing platform 102 may also comprise a data output subsystem 102e that is configured to output data (e.g., processed data and/or derived insights) to certain consumer systems 106 over respective communication paths. These consumer systems 106 may take any of various forms.

For instance, as one possibility, the data output subsystem 102e may be configured to output certain data to client devices that are running software applications for accessing and interacting with the example computing platform 102, such as the two representative client devices 106a and 106b shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization (e.g., employees, contractors, etc.) and/or individuals seeking to obtain goods and/or services from the organization. As another possibility, the data output subsystem 102e may be configured to output certain data to other third-party platforms, such as the representative third-party platform 106c shown in FIG. 1.

In order to facilitate this functionality for outputting data to the consumer systems 106, the data output subsystem 102e may comprise one or more APIs that can be used to interact with and output certain data to the consumer systems 106 over a data network, and perhaps also an application service subsystem that is configured to drive the software applications running on the client devices, among other possibilities.

The data output subsystem 102e may be configured to output data to other types of consumer systems 106 as well.

Referring once more to FIG. 1, the example computing platform 102 may also comprise a data storage subsystem 102f that is configured to store all of the different data within the example computing platform 102, including but not limited to the source data, the processed data, and the derived insights. In practice, this data storage subsystem 102f may comprise several different data stores that are configured to store different categories of data. For instance, although not shown in FIG. 1, this data storage subsystem 102f may comprise one set of data stores for storing source data and another set of data stores for storing processed data and derived insights. However, the data storage subsystem 102f may be structured in various other manners as well. Further, the data stores within the data storage subsystem 102f could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, communication interfaces, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that network environment 100 is one example of a network environment in which a data platform may be operated, and that numerous other examples of network environments, data platforms, data sources, and consumer systems are possible as well.

As noted above, one key aspect of most data platforms today is the use of AI models to perform certain tasks related to an organization's business. The AI models that are utilized could take any of various forms, and one emerging type of AI models are LLMs, which is a sub-category of deep-learning AI models that are based on neural networks. At a high level, an LLM is a type of AI model that is configured to understand the meaning of text (e.g., words, phrases, context, etc.) in one or more languages (e.g., natural languages, programming languages, etc.) and to generate meaningful text in such languages in response to input. For instance, an LLM may receive input in the form of a prompt (e.g., text provided by a user in one or more languages) and generate a response to the prompt (e.g., in the one or more languages). In general, LLMs are created by applying machine-learning processes to vast sets of training data that comprise text written in one or more languages. For instance, an LLM may first be pre-trained on a large, diverse training dataset, which produces what is sometimes referred to as a "pre-trained" or "general-purpose" LLM, after which time the LLM could either be (i) utilized in its pre-trained, general-purpose form or (ii) further trained on a more targeted training dataset (e.g., a domain-specific or task-specific training dataset) in order to produce what is sometimes referred to as a "fine-tuned" (and perhaps domain- or task-specific) LLM. Alternatively, an LLM could be trained on a more targeted training dataset (e.g., a domain-specific or task-specific training dataset) in the first instance, which may produce what is sometimes referred to as a "from-scratch" (and perhaps domain- or task-specific) LLM.

Most LLMs today are based on a transformer architecture, which was first introduced in a paper entitled "Attention is All You Need" by Vaswani et al. (the "Vaswani paper"), which was published on Jun. 12, 2017, is available at https://arxiv.org/abs/1706.03762v1, and is incorporated by reference herein in its entirety.

Figure 2A:
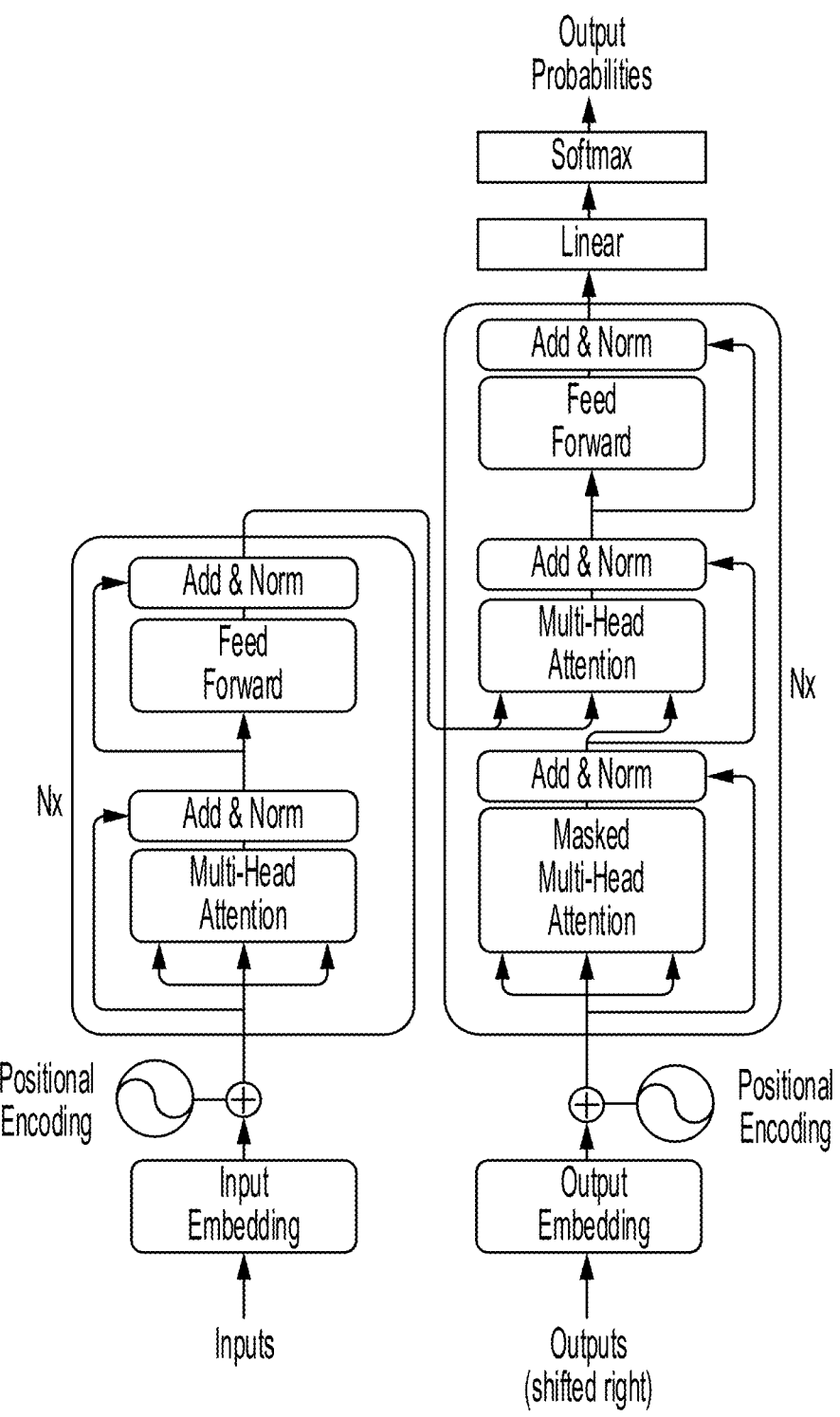
FIG. 2A shows an illustration of a transformer architecture that may form the basis for a deep-learning AI model.

FIG. 2A shows an illustration of the transformer architecture proposed in the Vaswani paper. As shown in FIG. 2A, the original transformer architecture includes both an encoder (shown on the left side of the diagram) and a decoder (shown on the right side of the diagram), each of which is composed of a stack of N layers. Each encoder layer is shown to include (i) an unmasked multi-head attention sub-layer and (ii) a feed forward sub-layer comprising a fully-connected feed-forward neural network that is commonly referred to as a multi-layer perceptron (MLP), each of which has a residual connection and layer normalization (shown in the figure as Add & Norm blocks). In turn, each decoder layer is shown to include (i) a masked multi-head attention sub-layer, (ii) an unmasked multi-head attention sub-layer, and (iii) a feed forward sub-layer comprising a fully-connected feed-forward neural network (i.e., an MLP), each of which has a residual connection and layer normalization (shown in the figure as Add & Norm blocks). The input to the encoder is an input token embedding that has been combined with a positional encoding, and the output of the encoder is then provided as input to the decoder along with an output token embedding that has been combined with a positional encoding. In turn, the output of the decoder is provided to a linear layer, and the output of the linear layer is provided to a softmax layer that produces probabilities of different vocabulary elements.

The transformer architecture shown in FIG. 2A is based on the attention mechanism, which utilizes Query, Key, and Value vectors that are computed by applying learnable projection matrices (commonly referred to as the Query, Key, and Value weight matrices) along with corresponding bias terms to input token representations. For each token position, a query vector is derived, and attention is applied over a set of key and value vectors derived from tokens in the context (e.g., tokens from the same sequence or from another sequence). The query and key vectors share the same dimensionality, while value vectors may have a different dimensionality that typically matches the output dimension. The output of the attention mechanism is a weighted sum of value vectors, where the weights are determined by a softmax applied to the scaled dot products between the query vector and the key vectors.

While the attention mechanism is described above in the context of a single attention head and a single query, in practice, each multi-head attention sub-layer executes multiple attention heads in parallel. The outputs of these heads are concatenated and then passed through a linear transformation that applies a learnable output projection matrix and a corresponding bias term to produce the final output of the multi-head attention sub-layer. This final output is passed through a residual connection and layer normalization, and is then sent to the MLP sub-layer of the encoder or decoder layer.

In turn, the MLP sub-layer of each encoder and decoder layer of the transformer architecture is responsible for transforming the output from a multi-head attention sub-layer through a fully connected, position-wise neural network. Each such MLP sub-layer may itself include two linear sub-layers with an activation function in between, which is typically a ReLU (Rectified Linear Unit) activation. In this respect, (i) the first linear sub-layer may apply a first linear-layer weight matrix and a corresponding first bias term to transform an output of a multi-head attention sub-layer into a higher-dimensional space, (ii) the activation function may introduce non-linearity into the transformed output in an element-wise manner, and (iii) the second linear sub-layer may apply a second linear-layer weight matrix and a corresponding second bias term to transform the output of the activation function back into the original dimensionality. The output of this second transformation is passed through a residual connection and layer normalization, and is then provided to the next encoder or decoder layer in the transformer stack. In this respect, the weight matrices and corresponding bias terms of each such MLP sub-layer generally serve to transform data between layers and also learn patterns and relationships between the data.

In an LLM that is based on such a transformer architecture, the individual numerical values that are included within the learnable matrices (e.g., the Query, Key, and Value weight matrices of the individual attention heads, the output projection matrices of the multi-head attention sub-layers, and the linear-layer weight matrices of the MLP sub-layers) and corresponding bias terms are some of the key categories of numerical parameters for the LLM, although it is possible that an LLM based on a transformer architecture could include other categories of numerical parameters as well (e.g., embedding layer parameters, layer normalization parameters, final output layer parameters, etc.).

Further details regarding the original transformer architecture can be found in the Vaswani paper.

Figure 2B:
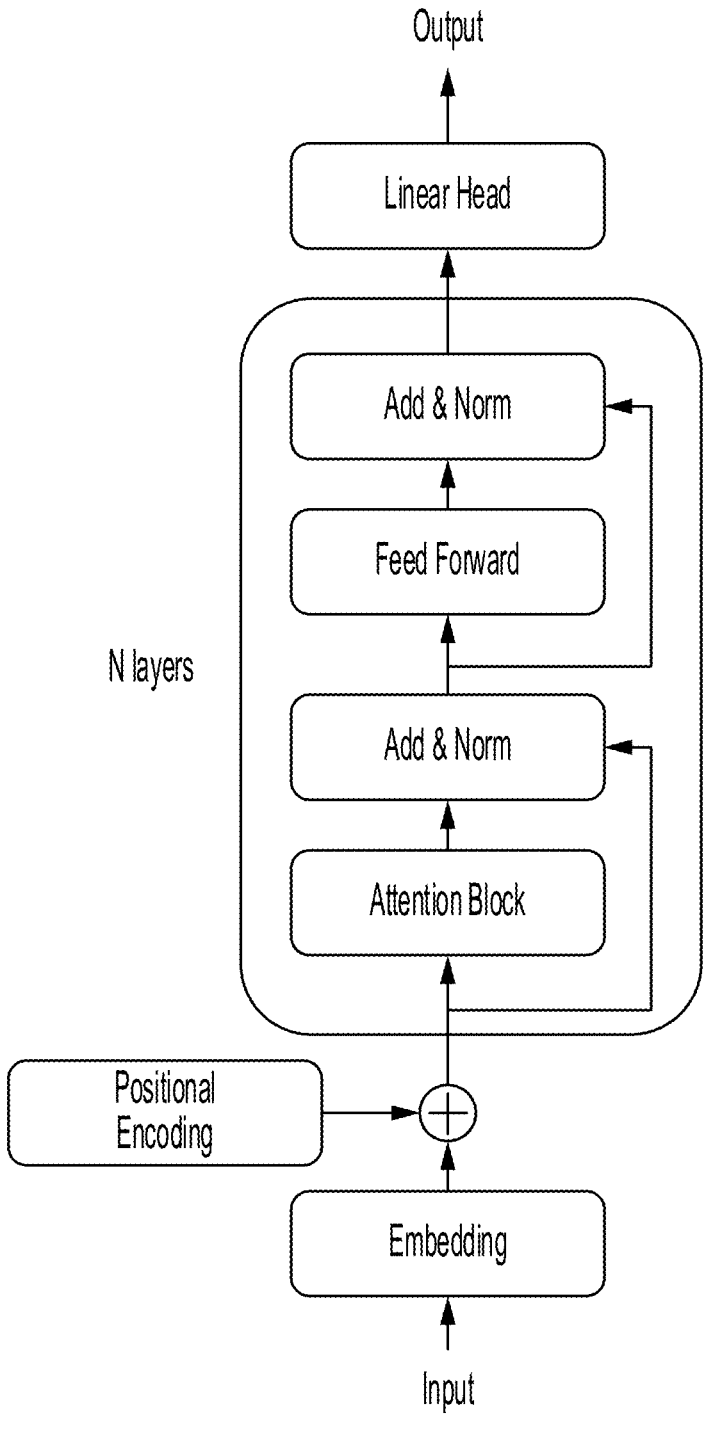
FIG. 2B illustrates one possible implementation of an encoder-only transformer architecture.
Figure 2C:
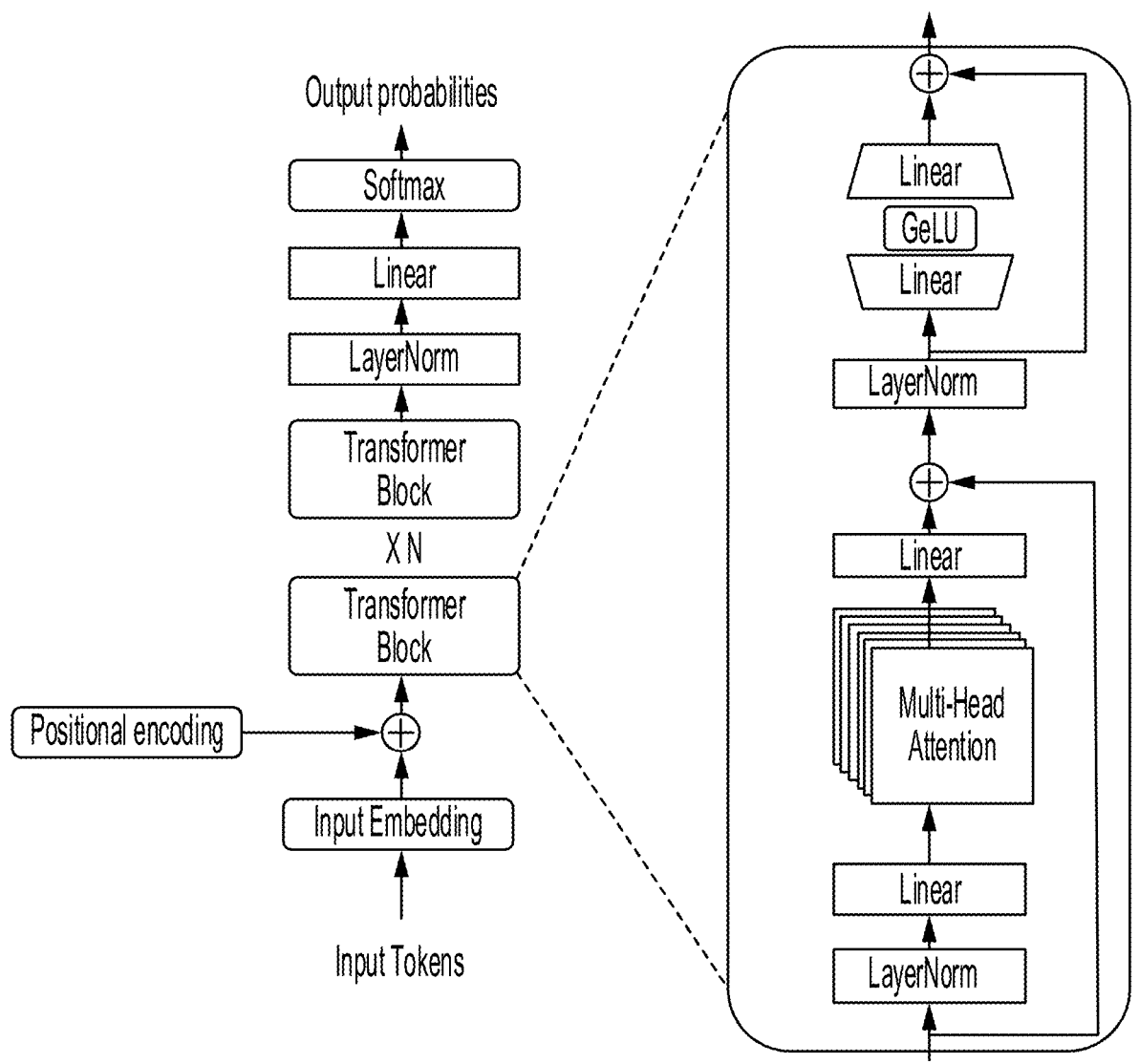
FIG. 2C illustrates one possible implementation of a decoder-only transformer architecture.

Since the initial introduction of the transformer architecture, several implementations of the original transformer architecture comprising both an encoder and decoder have been developed (e.g., T5, BART, etc.), and several variations of the original transformer architecture have been developed as well, including but not limited to encoder-only variations and decoder-only variations. FIG. 2B illustrates one possible implementation of an encoder-only transformer architecture, and some well-known examples of LLMs based on an encoder-only transformer architecture include the Bidirectional Encoder Representations from Transformers (BERT) LLM and its variants (e.g., ROBERTa, ALBERT, deBERTa etc.), among various other examples. Further, FIG. 2C illustrates one possible implementation of a decoder-only transformer architecture, and some well-known examples of LLMs based on a decoder-only transformer architecture include the GPT family of LLMs (e.g., GPT-1, GPT-2, GPT-3, GPT-4, etc.), the LLaMA family of LLMs (e.g., LLaMa1, Llama2, Llama3.x, etc.), and the PaLM family of LLMs (e.g., PaLM 2, etc.), among various other examples.

It will also be appreciated that LLMs are not the only types of deep-learning AI models that are based on the transformer architecture—other types of deep-learning AI models that are based on the transformer architecture include small language models (SLMs) and vision-language models, among others.

Likewise, it will be appreciated that deep-learning AI models (including certain types of LLMs) can be based on deep-learning architectures other than the transformer architecture, such as a convolutional neural-network (CNN) architecture, a recurrent neural network (RNN) architecture (e.g., a Long-Short Term Memory (LSTM) architecture), a generational adversarial network (GAN) architecture, or a variational autoencoder (VAE) architecture, among others. However, depending on the use case, the transformer architecture may provide certain advantages over other types of deep-learning architectures. For instance, the transformer architecture tends to be superior in capturing long-term dependencies, which is due in part to the non-sequential and parallel manner by which the transformer architecture processes data. Further, the transformer architecture allows for transfer learning, which means that an AI model based on the transformer architecture can be pre-trained on large corpora and then fine-tuned for downstream tasks-a fact that facilitates developing new AI applications tailored for in-house datasets based on pre-trained models.

The development of deep-learning AI models such as LLMs has provided significant advancement in the field of AI by enabling computing systems to understand and generate human-like text with unprecedented accuracy and fluency, which has opened up a host of new use cases for AI models. For instance, LLMs may be used for tasks such as answering questions (e.g., closed questions about specific facts, open-ended questions, etc.), engaging in conversations (e.g., as a component of a Chatbot), generating text (e.g., writing stories, poems, articles, scripts, etc.), summarizing documents, translating text from one language to another, generating programming code (e.g., writing computer programs or portions thereof), analyzing sentiment (e.g., detecting emotions and/or opinions expressed in text), and performing named entity recognition (NER) (e.g., identifying proper nouns that refer to specific legal entities, dates, locations, etc.), among other possibilities.

Given their versatility, deep-learning AI models such as LLMs have been deployed across a wide range of industries. For example, in the healthcare industry, deep-learning AI models may assist medical professionals diagnose diseases across diverse patient demographic groups, recommend treatments based on medical records, generate training materials for healthcare professionals, and/or predict drug effectiveness, among other possibilities. As another example, in the human resources industry, deep-learning AI models may be used to screen and evaluate résumés from diverse candidate pools, generate onboarding materials, and/or analyze employee performance, among other possibilities. As another example, in the public sector, deep-learning AI models may support equitable policy decision making in various areas (e.g., criminal justice, social services, education, etc.). As yet another example, in the legal industry, deep-learning AI models may help analyze legal arguments, cases, and/or documents, assist with drafting legal documents, and/or assist with legal research, among other possibilities. As yet another example, in the financial industry, deep-learning AI models may detect fraud, evaluate creditworthiness, evaluate and manage risk, optimize portfolio allocations, and/or determine credit scores, among other possibilities. As a further example, in the advertising industry, deep-learning AI models may generate and recommend personalized advertising content, analyze the effectiveness of marketing campaigns across different demographic groups, among other possibilities. As another example, in the retail industry, deep-learning AI models may answer customer queries and/or recommend products that meet customer objectives, among other possibilities. As still another example, in the education industry, deep-learning AI models may help answer student questions, generate practice problems, grade essays, summarize educational materials, translate educational materials, among other possibilities. As a further example, in the military industry, deep-learning AI models may help translate communications between allies, generate reports on cybersecurity threats, among other possibilities. As another example, in the fashion industry, deep-learning AI models may help generate personalized fashion recommendations and/or predict emerging fashion trends, among other possibilities.

Despite the broad applicability of deep-learning AI models such as LLMs across numerous industries, several problems remain with deploying deep-learning AI models, which may diminish the benefits associated with their use.

As one example, deep-learning AI models demand substantial memory and computational resources, which often necessitates specialized hardware for training, deployment, and execution. Consequently, deep-learning AI models can be costly to deploy, inefficient with respect to resource utilization, and may even be impractical for use on resource-constrained devices. Moreover, because deep-learning AI models can be computationally intensive, such models may introduce significant latency during execution, which may render deep-learning AI models unsuitable for applications that demand real-time responsiveness, such as financial transaction processing, fraud detection, etc. Further, in industries where security and privacy are essential, the complexity and infrastructure requirements of deep-learning AI models may elevate the risk of data exposure and pose challenges in integrating such deep-learning AI models within secure and/or regulated environments.

As another example, some industries are subject to strict regulations designed to ensure fair treatment across diverse demographic groups (e.g., demographic groups based on gender, race, age, sexual orientation, religion, marital status, etc.). However, deep-learning AI models may inadvertently amplify biases inherent in their training datasets, which may result in discriminatory and/or inaccurate prediction results that may [midjudge] misjudge or even exclude underrepresented demographic groups. Such biased outcomes can limit customer acquisition, harm business reputation, expose organizations to serious violations of applicable federal, state, and/or local laws and regulations, including but not limited to the U.S. Equal Credit Opportunity Act, and/or trigger other adverse consequences.

There are existing approaches that attempt to address the computational demands and fairness-related concerns associated with deep-learning AI models such as LLMs. But these existing approaches often trade off one challenge at the expense of the other, and do not provide a unified solution capable of addressing both computational demands and fairness-related concerns.

For example, one existing approach attempts to mitigate the resource-intensive nature of deep-learning AI models by applying compression techniques, such as quantization. Compression techniques generally aim to reduce the size of deep-learning AI models while maintaining acceptable model performance levels. In particular, as described in more detail below, quantization generally involves lowering the precision levels of model parameters (e.g., down to int8 or int4, among other possible values). This reduction in precision may significantly decrease memory usage and computational overhead, thereby facilitating the deployment of deep-learning AI models on resource-constrained devices, such as edge devices. However, while compression techniques like quantization may improve efficiency, it does not inherently address biases in model prediction results (e.g., disparities between demographic groups), and in some instances, compression techniques like quantization may even exacerbate biases in model prediction results by reducing precision levels of certain model parameters.

In another existing approach, adversarial training may be employed in an attempt to address biases in deep-learning AI models. The adversarial training approach may generally involve training an adversarial classifier to predict demographic attributes (e.g., race, gender, etc.) from a deep-learning AI model's output. If the adversarial classifier successfully identifies such demographic attributes, the deep-learning AI model may be retrained to reduce this predictability and thereby reduce biases and promote fairer model prediction results. However, while the adversarial training approach can be effective in reducing some bias, it does not address the computational and memory demands of deep-learning AI models. In fact, the adversarial training approach typically requires retraining a full-sized model without applying any compression techniques (e.g., quantization), which may often require significant resource consumption.

Yet another existing approach-referred to as the "FairQuantize" approach-attempts to address both computational demands and biases of deep-learning AI models. At a high level, the FairQuantize approach generally involves applying a selective quantization technique to reduce the precision levels of parameters that disproportionately influence prediction results, particularly with respect to underrepresented demographic groups. In other words, the "FairQuantize" approach seeks to reduce the amplified biases present in the original training data of deep-learning AI models. However, while the FairQuantize approach may reduce certain biases amplified by the original training data, it does not address new biases that may be introduced as a result of reducing precision levels of parameters through quantization.

To address these and other problems with existing technology, disclosed herein is new software technology for creating, deploying, and monitoring a fairness-aware quantized version of a deep-learning AI model such as an LLM. The disclosed software technology addresses both computational demands and fairness-related concerns associated with deep-learning AI models such as LLMs (e.g., prediction results that disproportionally disadvantage or favor one particular demographic group over another).

At a high level, the disclosed software technology may involve functionality for creating a quantized version of a deep-learning AI model that includes (i) defining configuration settings for the model creation process, (ii) generating fairness-importance scores for model parameters of the deep-learning AI model based on their influence on fair prediction results, (iii) based on the fairness-importance scores, producing multiple candidate quantized versions of the deep-learning AI model, and identifying the best candidate as a final quantized version of the deep-learning AI model that is to be deployed in place of the original version of the deep-learning AI model, and (iv) updating (e.g., fine-tuning) the final quantized version of the deep-learning AI model. Additionally, the disclosed software technology may involve functionality for deploying the final quantized version of the deep-learning AI model and then evaluating the deployed model's prediction results to ensure that fairness objectives remain satisfied after deployment. In practice, one or more functional components may be employed to implement the foregoing functionalities.

The disclosed software technology improves over the existing technology discussed above in various ways.

First, generally speaking, by addressing both computational demands and fairness-related concerns associated with deep-learning AI models, the disclosed software technology provides significant advantages over existing technologies, including reduced operational costs through optimized resource utilization, enhanced organizational reputation by promoting fair outcomes across demographic groups, and increased public trust through regulatory compliance with fairness standards.

Second, the disclosed software technology proactively mitigates biases in prediction results throughout multiple phases of the model's lifecycle, including before quantization, during quantization, throughout the fine-tuning process, and after deployment (e.g., to account for conditions that may change over time, such as evolving regulatory standards and/or demographic shifts, etc.). This approach ensures that fairness concerns are embedded as a core objective rather than treated as an afterthought.

As one example to illustrate, the disclosed software technology may utilize a group-stratified dataset that is partitioned based on demographic attributes (e.g., gender, race, age, sexual orientation, religion, marital status, etc.), and this group-stratified dataset may be used to establish baseline fairness metrics for each demographic group (e.g., true positive, false positive, false negative rates, etc.). These baseline fairness metrics may in turn be used to determine fairness-importance scores for certain model parameters as further discussed below. In this way, the baseline fairness metrics may help identify disparities in model prediction results across different demographic groups and serve as a reference point for assessing the influence of individual model parameters on producing fair model predictions that do not disadvantage or favor one particular demographic group over another.

As another example to illustrate, the disclosed software technology involves mixed-precision quantization of a deep-learning AI model, such that model parameters that have more influence on fair model prediction results across different demographic groups may be quantized at full or high precision levels (e.g., FP64, FP32, FP16, among other possible values) to minimize the adverse effects of quantization on fairness, whereas other parameters that have lesser influence on fair model prediction results may be quantized at lower precision levels (e.g., int8, int4, int3, or int2, among other possible values). This mixed-precision quantization approach substantially reduces the computational and memory footprint of the full-sized deep-learning AI model without major loss in outputting fair prediction results, and may thus enable deployment on cost-effective or resource-constrained hardware devices (e.g., edge devices, existing on-premise servers, etc.).

As yet another example to illustrate, as discussed below, the disclosed software technology may further involve fine-tuning a quantized version of the deep-learning AI model using a Low-Rank Adaptation (LoRA) technique. LoRA may generally involve introducing small, trainable low-rank matrices into specific layers (e.g., an attention sub-layer) of the final quantized version of the deep-learning AI model, while the quantized parameters remain frozen. This adapter-based approach may enable rapid deployment and efficient updates to the deployed model without requiring full model retraining, thereby avoiding lengthy redevelopment cycles, which may be critical in certain regulated industries (e.g., the financial industry) that demand prompt responses to new or evolving regulatory standards concerning fairness. For example, in response to a new fairness requirement, the disclosed software technology may enable quick modification of the overall loss function discussed below and re-execution of the fine tuning process to ensure compliance with the new fairness requirement without necessitating full model retraining and/or quantization.

The disclosed software technology may provide various other advantages over the existing technology as well.

Figure 3:
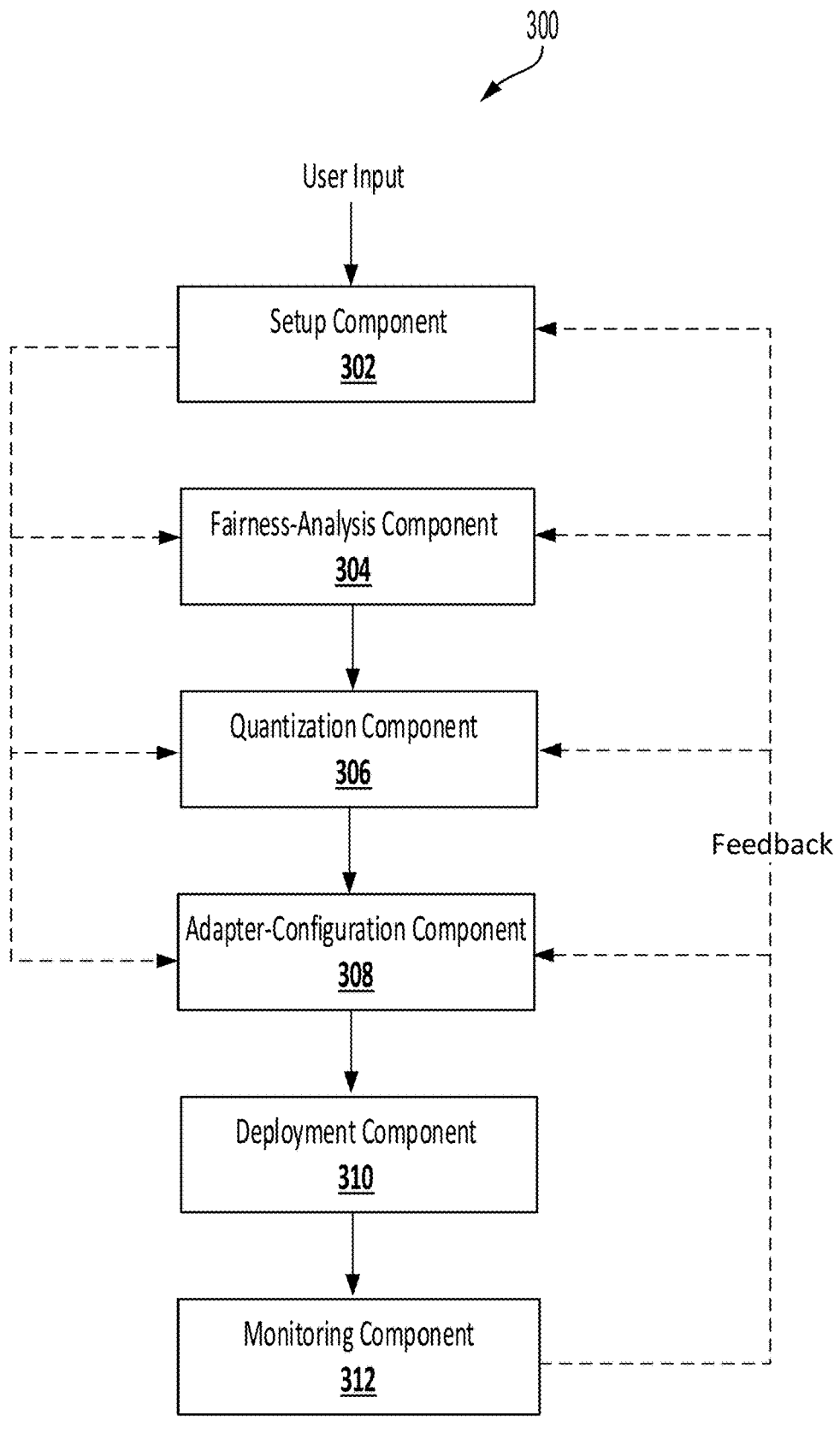
FIG. 3 illustrates an example software-based pipeline in accordance with the present disclosure.

Turning now to FIG. 3, a block diagram of an example software-based pipeline 300 for creating, deploying, and monitoring a fairness-aware quantized version of a deep-learning AI model in accordance with the present disclosure is shown. In practice, the example software-based pipeline 300 may comprise a set of functional components, each of which may be encoded in the form of program instructions that are executable by one or more processors of one or more computing platforms. For purposes of illustration, the example software-based pipeline 300 is described as being installed on and executed by the computing platform 102 of FIG. 1 (e.g., as part of the data analytics subsystem 102d), but it should be understood that the example software-based pipeline 300 may be installed on and executed by any one or more computing platforms that are capable of performing the example operations of the example software-based pipeline 300, and in some cases, different components of the example software-based pipeline 300 may be executed by different computing platforms that communicate with one another via a network-based communication path. Further, it should be understood that the example software-based pipeline 300 is merely described in this manner for the sake of clarity and explanation and that the example operations may be implemented in various other manners, including the possibility that operations may be added, removed, rearranged into different orders, combined into fewer blocks, and/or separated into additional blocks depending upon the particular embodiment.

As shown in FIG. 3, the example software-based pipeline 300 may comprise a setup component 302, a fairness-analysis component 304, a quantization component 306, an adapter-configuration component 308, a deployment component 310, and a monitoring component 312, among other possible components that may be included in the example software-based pipeline 300. Each of these software components will now be described in further detail.

To begin, the setup component 302 of the example software-based pipeline 300 may generally facilitate defining configuration settings that may govern the downstream functions of other components of the example software-based pipeline 300, such as the downstream functions related to creating the quantized version of the deep-learning AI model. The configuration settings may generally define strategies for (i) evaluating the deep-learning AI model that is to be quantized (e.g., how the model's prediction results vary across different demographic groups), (ii) quantization, and/or (iii) fine-tuning, and may thus impact the prediction results output by the quantized version of the deep-learning AI model being created and deployed (e.g., with respect to outputting fair prediction results across different demographic groups) and/or the efficiency of the quantized version of the deep-learning AI model. In this respect, defining the configuration settings may help ensure that both hardware constraints and fairness objectives—which are objectives aimed at mitigating potential biases against underrepresented demographic groups—are upheld throughout the process of creating and deploying the quantized version of the deep-learning AI model.

At a high level, the setup component 302 of the example software-based pipeline 300 may generally function to (i) provide a user interface for inputting configuration settings for the example software-based pipeline 300, (ii) receive data defining the configuration settings that are input by a user via the user interface (e.g., at a client device operated by the user), and (iii) pass subsets of the data defining the configuration settings to different components of the example software-based pipeline 300. The configuration settings that are input via the user interface and received by the setup component 302 could take any of various forms.

As one possibility, the configuration settings may comprise group-level fairness settings that may regulate the prediction results across different demographic groups (e.g., demographic groups based on gender, race, age, sexual orientation, religion, marital status, etc.). For example, the group-level fairness settings may comprise constraints for maintaining a true positive rate—which may reflect the proportion of individuals for whom the quantized version of the deep-learning AI model being created and deployed should output a positive prediction result (e.g., approval, acceptance, selection, etc.)—above a specified threshold for each demographic group or for each underrepresented demographic group (e.g., 80% across underrepresented groups, 70% across all demographic groups, etc.). As another example, the group-level fairness settings may comprise constraints such as acceptable ranges for false negative and/or false positive rates for different demographic groups to ensure that model prediction results remain fair across different demographic groups.

The group-level fairness settings may influence the downstream functions of other components of the example software-based pipeline 300 in various ways. As one example to illustrate, the group-level fairness settings may influence the functions of the quantization component 306, such as when determining the best candidate quantized version of the deep-learning AI model as discussed below. For instance, if a candidate quantized version of the deep-learning AI model does not satisfy the constraints (e.g., true positive rate) defined in the group-level fairness settings, that candidate may not qualify as the best candidate quantized version of the deep-learning AI model as discussed below.

As another example to illustrate, the group-level fairness settings may influence the functions of the adapter-configuration component 308 when updating the final quantized version of the deep-learning AI model before deployment. For instance, the group-level fairness settings may guide adjustments to the overall loss function (discussed below) and/or the low-rank matrices introduced into specific layers of the final quantized version of the deep-learning AI model (also discussed below) to ensure compliance with fairness requirements (e.g., maintaining 80% true positive rate across underrepresented groups).

The group-level fairness settings may take other forms and influence the downstream functions of various other components of the example software-based pipeline 300 as well.

As another possibility, the configuration settings may comprise fairness-analysis settings that can be defined and later used by one or more other software components of the example software-based pipeline 300 (e.g., the fairness-analysis component 304) to establish baseline fairness metrics (e.g., true positive rates, false negative rates, etc.) for each demographic group. The fairness-analysis settings may take various forms.

As one example, the fairness-analysis settings may comprise an attribute selection setting that may specify the demographic attributes (e.g., gender, race, age, sexual orientation, religion, marital status, etc.) to be used for partitioning a dataset into a group-stratified dataset, which can be later used by the fairness-analysis component 304 to establish baseline fairness metrics for each demographic group as described below.

As another example, the fairness-analysis settings may comprise a sampling strategy setting that may be used to control how data is sampled to ensure that all demographic groups are adequately represented. In this regard, the fairness-analysis settings may help ensure that the baseline fairness metrics are accurately reflected across all demographic groups, including underrepresented demographic groups that may otherwise be overlooked.

The fairness-analysis settings may take various other forms. The configuration settings that are input via the user interface and received by the setup component 302 may take various other forms as well.

As another possibility, the configuration settings may comprise quantization settings that may be defined and later used by one or more other software components of the example software-based pipeline 300 (e.g., the quantization component 306) for creating a quantized version of the deep-learning AI model. Generally speaking, the quantization settings may define the precision levels of model parameters and these precision levels may be used to create the quantized version of the deep-learning AI model. The quantization settings may take various forms.

As one example, the quantization settings may include a global quantization setting for defining a baseline precision level (e.g., int8, int4, among other possible values) for most model parameters that may have lesser influence on fair model prediction results across different demographic groups.

As another example, the quantization settings may include parameter-specific quantization settings for defining full or high precision levels (e.g., FP64, FP32, FP16, among other possible values) for specific model parameters that may influence fair model prediction results across different demographic groups. In accordance with the present disclosure, preserving full or high precision levels for fairness-sensitive parameters may mitigate adverse effects of quantization on providing prediction results across different demographic groups.

As yet another example, the quantization settings may include an automated quantization option that, when enabled, dynamically adjusts the precision levels of model parameters based on one or more factors. For instance, the automated quantization option, when enabled, may dynamically adjust the precision levels of model parameters based on hardware constraints (processing capabilities, memory capacity, etc.) and/or latency budget (e.g., the maximum allowable time to return a prediction result, which may be critical in real-time or low-latency applications). In this regard, parameters may be assigned full or higher precision levels under lenient hardware constraints and/or latency conditions, whereas lower precision levels may be assigned to parameters under more stringent hardware constraints and/or latency conditions to optimize performance without violating hardware and/or latency requirements.

Additionally or alternatively, the automated quantization option, when enabled, may dynamically adjust the precision levels of model parameters based on the fairness-importance score for each parameter, which may be later determined by the fairness-analysis component 304 as discussed below. In this regard, parameters with high fairness-importance scores—and thus may have more influence on fair model prediction results across different demographic groups—may be assigned full or high precision levels, whereas parameters with low fairness-importance scores—and thus may have lesser influence on fair model prediction results across different demographic groups—may be assigned lower precision levels.

The automated quantization option and the quantization settings may take various other forms as well.

As yet another possibility, the configuration settings may comprise fine-tuning settings that may be defined and later used by one or more other software components of the example software-based pipeline 300 (e.g., the adapter-configuration component 308) to fine-tune the final quantized version of the deep-learning AI model. The fine-tuning settings may take various forms.

As one example, the fine-tuning settings may comprise global fine-tuning settings that may apply to the overall fine-tuning process, such as batch size, number of epochs, and/or mini-batch scheduling settings, among other global fine-tuning settings. These global fine-tuning settings may take various forms.

For instance, the batch size setting may define the number of training samples processed together in a single forward or backward pass during fine-tuning. In this regard, large batch sizes may improve training throughput (e.g., the number of samples processed per unit of time) and thereby accelerate the fine-tuning process. However, larger batch sizes may require substantial memory and may not be feasible on resource-constrained devices. In contrast, smaller batch sizes may reduce memory usage but may slow down the fine-tuning process.

The number of epochs setting may define how many times the final quantized version of the deep-learning AI model may see the full dataset for fine-tuning. In this regard, a higher number of epochs may be resource intensive and slow down the fine-tuning process, but may improve the model's prediction results with respect to fairness by allowing the final quantized version of the deep-learning AI model to learn more deeply from the full dataset. In contrast, a lower number of epochs may reduce resource consumption and accelerate the fine-tuning process, but may limit the model's ability to improve its prediction results with respect to fairness.

The mini-batch scheduling setting may define strategies for organizing and feeding data into the final quantized version of the deep-learning AI model for fine-tuning. For example, the mini-batch scheduling setting may comprise a shuffling strategy that involves randomly reordering the training data at each epoch to prevent the final quantized version of the deep-learning AI model from learning spurious patterns based on data order. As another example, the mini-batch scheduling setting may comprise a bucketing strategy that involves grouping training samples with similar sequence lengths to minimize padding and optimize memory usage.

The global fine-tuning settings take various other forms as well.

The fine-tuning settings may also take various other forms as well, which may depend on the specific technique used for fine-tuning the final quantized version of the deep-learning AI model. For instance, in some implementations, a Low-Rank Adaptation (LoRA) technique may be applied to fine-tune the final quantized version of the deep-learning AI model. LoRA may generally involve introducing small, trainable low-rank matrices into specific layers (e.g., an attention sub-layer) of the final quantized version of the deep-learning AI model, while the quantized parameters remain frozen. During fine-tuning, only these low-rank matrices may be updated, thereby preserving the quantized parameters and associated benefits with respect to computational efficiency. These low-rank matrices may function as lightweight adapters that approximate parameter adjustments in a memory-efficient manner. In such implementations where a LoRA technique is applied for fine-tuning the final quantized version of the deep-learning AI model, the fine-tuning parameters may comprise various LoRA-specific fine-tuning settings, such as adapter rank and learning rate settings, among other LoRA-specific fine-tuning settings. The LoRA-specific fine-tuning settings may take various forms.

For instance, the adapter rank setting may define the dimensionality of the low-rank matrices. Generally speaking, LoRA may involve learning the product of two smaller matrices-one with fewer rows and one with fewer columns-whose dimensions may be defined by the adapter rank setting. In this regard, selecting an appropriate adapter rank may be critical in balancing model performance and computational efficiency. For instance, a lower adapter rank may reduce memory usage but may limit the model's ability to capture complex patterns, such as those associated with fairness. In contrast, a higher adapter rank may improve the model's ability to capture complex patterns but may require more memory usage.

The learning rate setting may specify how quickly the low-rank matrices introduced by the LoRA technique are updated during fine-tuning. In this regard, selecting an appropriate learning rate can be important in balancing training speed and stability when fine-tuning the final quantized version of the deep-learning AI model. For instance, a higher learning rate may accelerate learning by applying larger adjustments to the low-rank matrices during fine-tuning, but may lead to instability, as larger adjustments to the low-rank matrices may lead to erratic behavior. In contrast, a lower learning rate may slow down the overall learning progress by applying smaller, more gradual adjustments to the low-rank matrices during fine-tuning, but may promote stability.

The LoRA-specific fine-tuning settings may take various other forms as well. For instance, the LoRA-specific fine-tuning settings may also comprise a setting for defining a value of the penalty coefficient that can be later used by the adapter-configuration component 308 to guide adjustments to the overall loss function (discussed below) and fine-tune the final quantized version of the deep-learning AI model.

Further, it should be understood that, while the setting for defining the value of the penalty coefficient is described as one of the LoRA-specific fine-tuning settings, such setting may not necessarily be LoRA-specific and may generally apply to any other fine-tuning technique that involves an overall loss function that comprises a penalty coefficient.

The fine-tuning settings may take various other forms as well.

Further, the configuration settings that are input via the user interface and received by the setup component 302 could take various other forms as well.

In line with the discussion above, the setup component 302 may provide a user interface for inputting the configuration settings for the example software-based pipeline 300, and may receive data defining the configuration settings that are input by a user via the user interface. In practice, the configuration settings may be input by the user via a given client device (e.g., client device 106a or 106b of FIG. 1), which may encode the configuration settings input by the user into a communication (e.g., one or more messages) and send it to the computing platform 102 over a network-based communication path. It should be understood, however, that the configuration settings may be input by the user and received by the computing platform 102 (and in turn, passed to the setup component 302) in various other manners as well.

Further, it should be understood that the configuration settings input by the user may be received at any of various times. As one possibility, while accessing the user interface on the given client device (e.g., client device 106a or 106b of FIG. 1), the user may input the configuration settings, and the configuration settings input by the user may be sent to the computing platform 102, which may pass the configuration settings to the setup component 302 of the example software-based pipeline 300. One of ordinary skill in the art would appreciate that the configuration settings input by the user may be received at various other times as well.

In turn, subsets of the configuration settings may be passed from the setup component 302 to different components of the example software-based pipeline 300. For instance, the fairness-analysis settings may be passed to the fairness-analysis component 304, the quantization settings may be passed to the quantization component 306, and the fine-tuning settings may be passed to the adapter-configuration component 308, among other possibilities.

In line with the discussion below, it should be understood that, after deploying the final quantized version of the deep-learning AI model, the setup component 302 may also be re-invoked to update the configuration settings to account for conditions that may change over time, such as evolving regulatory standards and/or demographic shifts.

Further, it should be understood that, in some implementations, after receiving the configuration settings that are input by the user via the user interface and before passing subsets of the configuration settings to different components, the setup component 302 may function to (i) validate the configuration settings to ensure that the configuration settings are compatible and feasible within various hardware constraints (e.g., memory capacity, processing power, etc.), and/or (ii) facilitate storage of the configuration settings to establish an audit trail that supports regulatory compliance and internal review processes.

The functionality of the setup component 302 may take various other forms as well.

With continued reference to FIG. 3, the fairness-analysis component 304 generally functions to identify model parameters within the original version of the deep-learning AI model that influence fair model prediction results across different demographic groups. These identified parameters may later be utilized (e.g., by the quantization component 306) to identify and select the best candidate quantized version of the deep-learning AI model that is to be deployed in place of the full version of the deep-learning AI model, where (i) the identified parameters may be quantized at full or high precision levels (e.g., FP64, FP32, FP16, among other possible values) to minimize the adverse effects of quantization on fairness while (ii) other parameters may be quantized at lower precision levels (e.g., int8, int4, int3, or int2, among other possible values).

At a high level, the fairness-analysis component 304 may function to (i) evaluate the fairness of the deep-learning AI model that is to be quantized by analyzing how the model's prediction results vary across different demographic groups, (ii) generate fairness-importance scores for parameters of the deep-learning AI model based on their influence on fair prediction results, and (iii) pass the fairness-importance scores to the quantization component 306, which may use the fairness-importance scores to assign mixed precision levels to different parameters during a process for identifying and selecting the best candidate quantized version of the deep-learning AI model that is to be deployed in place of the full version of the deep-learning AI model. Each of these functions may be implemented in various ways.

As one possibility, the function of evaluating the fairness of the deep-learning AI model that is to be quantized may begin with the fairness-analysis component 304 loading a group-stratified dataset that is partitioned based on demographic attributes (e.g., gender, race, age, sexual orientation, religion, marital status, etc.). In one example implementation, the group-stratified dataset may be defined in accordance with the attribute selection setting that may be included in the fairness-analysis settings discussed above with respect to the setup component 302. However, it should be understood that the group-stratified dataset may be defined in various other manners as well, which may depend on the available data and fairness objectives.

As previously discussed, the group-stratified dataset may play an important role in establishing baseline fairness metrics for each demographic group (e.g., true positive, false positive, false negative rates, etc.). For instance, after loading the group-stratified dataset that is partitioned based on demographic attributes, the fairness-analysis component 304 may use the group-stratified dataset to evaluate the deep-learning AI model's prediction results across different demographic groups by determining baseline fairness metrics (e.g., true positive, false positive, false negative rates) for each demographic group, where the baseline fairness metrics may provide a measure of how fairly the deep-learning AI model predicts results for the demographic group before any perturbations (e.g., quantization noise, temporary ablation, etc.) to the parameters of the deep-learning AI model are introduced. These baseline fairness metrics may in turn help identify disparities in model prediction results across different demographic groups and serve as a reference point for assessing the influence of individual model parameters on producing fair model predictions that do not disadvantage or favor one particular demographic group over another.

In some implementations, the function of evaluating the fairness of the deep-learning AI model that is to be quantized may also involve generating model-specific statistics (e.g., gradient magnitudes, activation distributions, etc.). These model-specific statistics may then be analyzed to determine the sensitivity of individual model parameters to fair model predicts results. This sensitivity analysis may provide a granular understanding of how specific parameters may influence fair or biased model prediction results and may inform targeted adjustments to precision levels during quantization to preserve fairness across different demographic groups while optimizing computational efficiency.

After loading the group-stratified dataset that is partitioned based on demographic attributes and determining the baseline fairness metrics, the function of evaluating the fairness of the deep-learning AI model that is to be quantized may next involve the fairness-analysis component 304 performing a fairness-importance analysis to identify which parameters of the deep-learning AI model may influence fair model predictions. Generally speaking, the fairness-importance analysis may involve analyzing the model-specific statistics discussed above and/or perturbing model parameters (either individually or in groups) and measuring the changes in fairness metrics (e.g., true positive, false positive, false negative rates, etc.) across different demographic groups. By quantifying the impact of the different model parameters on fair prediction results, the fairness-importance analysis may support informed decisions on assigning mixed precision levels to model parameters during quantization.

Based on the fairness-importance analysis, the fairness-analysis component 304 may function to generate fairness-importance scores for parameters of the deep-learning AI model. The fairness-importance score for a given model parameter may quantify the influence the model parameter may have on producing fair model prediction results across different demographic groups. These fairness-importance scores may be generated in various ways.

In one example implementation, the fairness-importance score for a given model parameter may be generated by determining a maximum absolute difference in a fairness metric (e.g., true positive, false positive, false negative rate, etc.) between any two demographic groups when the given model parameter is perturbed (e.g., via quantization noise or temporary ablation). This may involve comparing the fairness metric for each demographic group to a baseline fairness metric for the demographic group, and then identifying the worst-case disparity across any of two demographic groups. To illustrate, the fairness-importance score for each parameter may be defined as:

$$I_{fair}(\theta_i) = \max_{\{g,g'\}} |\Delta(f_{model-\theta_i}D^{(g)}) - \Delta(f_{model-\theta_i}D^{(g')})|,$$

where $I_{fair}(\theta_i)$ represents the fairness-importance score when model parameter $\theta_i$ is perturbed (e.g., via quantization noise or temporary ablation), $\Delta(\cdot)$ represents the change in the fairness metric resulting from the perturbation of parameter $\theta_i$, and $D^{(g)}$ and $D^{(g')}$ represent data subsets corresponding to demographic groups g and g', respectively.

In turn, after generating the fairness-importance scores for the parameters of the deep-learning AI model, the fairness-analysis component 304 may pass the fairness-importance scores to the quantization component 306.

Each of the foregoing functions of the fairness-analysis component 304 may be implemented in various other manners as well.

For instance, it should be understood that the fairness-importance scores may be generated in various other manners, which may depend on how a given model parameter may be perturbed (e.g., quantization noise, additive noise, scaling, etc.), what fairness metric is used (e.g., true positive, false positive, false negative rate, etc.), and/or the aggregation function used to generate the fairness-importance scores, which could be based on an aggregation function other than the maximum absolute difference (e.g., average or median absolute difference).

Further, it should be understood that the fairness-importance scores may be generated at different levels of granularity. For instance, while the above implementation focuses on generating the fairness-importance scores for individual model parameters, the fairness-importance scores may be generated at a higher level of granularity, such as by perturbing a group of model parameters (e.g., parameters associated with a particular layer, a particular multi-head attention sub-layer, a particular MLP sub-layer, a particular attention head, a particular component parts of an attention head, a particular computational subgraph, etc.). In this way, in some implementations, each fairness-importance score may quantify the collective influence that a group of model parameters may have on producing fair prediction results across different demographic groups, and the quantization of the model parameters may then be carried out at a group level rather than an individual-parameter level.

The functionality of the fairness-analysis component 304 may take other forms as well.

With continued reference to FIG. 3, the quantization component 306 generally functions to use the fairness-importance scores that were generated by the fairness-analysis component 304 to (i) produce multiple candidate quantized versions of the deep-learning AI model and (ii) identify and select a best candidate quantized version of the deep-learning AI model (e.g., a candidate with the best objective value) as the final quantized version of the deep-learning AI model that is to be deployed in place of the original version of the deep-learning AI model.

At a high level, the quantization component 306 may employ a mixed-precision quantization strategy (rather than a uniform quantization strategy) to selectively assign precision levels to the model parameters. For instance, model parameters that have more influence on fair model prediction results across different demographic groups may be allocated full or high precision levels, whereas parameters that have lesser influence on fair model prediction results may be assigned lower precision levels. This mixed-precision quantization strategy may enable the quantization component 306 to enhance model efficiency by reducing precision levels of certain parameters while preserving fair prediction results that do not disadvantage or favor one particular demographic group over another. The functionality of the quantization component 306 may take various forms.

As one possibility, the quantization component 306 may engage in an "optimization process" during which the quantization component 306 (i) produces multiple candidate quantized versions of the deep-learning AI model, where each such candidate quantized version of the deep-learning AI model differs from the other candidate quantized versions of the deep-learning AI model with respect to one or both of (a) the particular space of model parameters that are to have their precision frozen during quantization (i.e., the "frozen-parameter space") and/or (b) the particular quantization strategy utilized to reduce the precision level of the remaining space of model parameters (i.e., the "unfrozen-parameter space"), and then (ii) selects a "best" one of the candidate quantized versions of the deep-learning AI model as the final candidate quantized version of the deep-learning AI model. In operation, this optimization process may involve multiple different iterations of functionality for producing and evaluating a candidate quantized version of the deep-learning AI model, where each such iteration may involve a different combination of values for the scope of the frozen-parameter space and the quantization strategy utilized to reduce the precision level of the unfrozen-parameter space—which may be viewed as two possible dimensions for defining the specific quantization to be applied to the deep-learning AI model (i.e., the "quantization dimensions"). In this respect, the possible values for the scope of the frozen-parameter space and the quantization strategy for reducing the precision level of the unfrozen-parameter space may be defined in any of various manners.

Beginning with the scope of the frozen-parameter space, as one possibility, the possible values could be defined in terms of an extent of individual model parameters to freeze, such as a certain percentage of the total number of model parameters to freeze or a certain count of model parameters to freeze. As an example to illustrate, the possible values for the scope of the frozen-parameter space could comprise percentages of the total number of model parameters in the deep-learning AI model to freeze that range from 1% to ~75%, among other possible values.

As another possibility, the possible values for the scope of the frozen-parameter space could be defined in terms of an extent of model-parameter groups to freeze, such as the type and number of different internal aspects of the deep-learning AI model to have their associated parameters frozen. In this respect, the possible values for the scope of the frozen-parameter space could be defined in terms of different possible numbers of layers, multi-head attention sub-layers, MLP sub-layers, attention heads, attention-head parts, and/or combinations thereof (e.g. computational subgraphs such as circuits) that may be selected to have their associated parameters frozen, among other internal aspects of the deep-learning AI model that can be selected to have their associated parameters frozen.

Based on the foregoing, it will be appreciated that the possible values for the scope of the frozen-parameter space can be represented in terms of how many layers, sub-layers, components, sub-components, and/or combinations thereof (e.g., computational subgraphs such as circuits that may be at varying levels of granularity) of the deep-learning AI model are to have their parameters frozen during a given iteration, rather than how many individual model parameters of the deep-learning AI model are to be frozen during the given iteration. And relatedly, when the possible values for the scope of the frozen-parameter space are represented in this way, it will be appreciated that the scope of the frozen-parameter space could have multiple different values that could ultimately map to a very similar number of parameters. To illustrate with a simple example, it is possible that the scope of the frozen-parameter space could have (i) a first value that is represented as 1 decoder layer and (ii) a second value that is represented as 1 multi-head attention sub-layer and 1 MLP sub-layer. In such an example, these two values for the scope of the frozen-parameter space may correspond to similar numbers of parameters because each layer's parameters are primarily comprised of the parameters of its multi-head attention and MLP sub-layers. However, for purposes of the iterations discussed herein, these two values may be treated as different scopes of the frozen-parameter space, as they may result in the identification of different frozen-parameter spaces given that the 1 multi-head attention sub-layer and the MLP sub-layer that are selected based on the mechanistic explanations may come from different decoder layers.

The possible values for the scope of the frozen-parameter space could be defined in other manners and/or take other forms as well.

Turning next to the quantization strategy for reducing the precision level of the unfrozen-parameter space, as one possibility, the possible values could be defined in terms of the reduced precision level to which the unfrozen-parameter space is to be quantized. As an example to illustrate, the possible values for the quantization strategy could comprise reduced precision levels of FP32 (if the full precision level is FP64), FP16, int8, int4, int3, or int2, among other possible values. In this respect, the particular values that are utilized for the reduced precision level could depend on factors such as the full precision level of the deep-learning AI model's parameters and/or information about a target size of the quantized version of the deep-learning AI model, among other possible factors.

The possible values of the quantization strategy for reducing the precision level of the unfrozen-parameter space may be defined in other various manners and/or take other forms as well. For instance, in addition to the reduced precision level, the possible values of the quantization strategy for reducing the precision level of the unfrozen-parameter space could also be defined in terms of the particular quantization technique that is utilized to quantize the unfrozen-parameter space to the reduced precision level (i.e., a quantization strategy could be defined in terms of a combination of (i) reduced precision level and (ii) quantization technique). However, for purposes of illustration and explanation, the possible values of the quantization strategy for reducing the precision level of the unfrozen-parameter space are primarily described below in terms of different reduced precision levels.

Further, the manner in which the computing platform 102 carries out the different iterations of the functionality for producing and evaluating a candidate quantized version of the deep-learning AI model using the different combinations of values for the quantization dimensions may take various different forms.

As one possibility, the computing platform 102 may be configured to cycle through different iterations of the functionality for producing and evaluating a candidate quantized version of the deep-learning AI model in a sequential manner whereby the computing platform 102 (i) utilizes an initial combination of values for quantization dimensions during the first iteration of such functionality (e.g., a most-conversative combination of values for the two quantization dimensions), and then (ii) for each subsequent iteration in the sequence, utilizes an updated combination of values for the quantization dimensions relative to the combination of values utilized for the prior iteration (e.g., incrementally-more-aggressive value for one or both of the two quantization dimensions). Such a sequential approach for carrying out iterations of the functionality for producing and evaluating a candidate quantized version of the deep-learning AI model may take any of various forms.

For instance, one possible implementation of such a sequential approach for carrying out iterations of the functionality for producing and evaluating a candidate quantized version of the deep-learning AI model may involve a single-level iterative approach that treats the combination of the two quantization dimensions (i.e., the scope of the frozen-parameter space and the quantization strategy for reducing the precision level of the unfrozen-parameter space) as a single looping variable and loops over different possible value combinations for the two quantization dimensions—where each respective value combination that is utilized may differ from the prior value combination with respect to one or both of the two quantization dimensions. And in this implementation, the computing platform 102 may continue to initiate new iterations of such functionality until either (i) a stopping condition for the loop is reached (to the extent that a stopping condition for the loop has been put into place), or (ii) all possible values combinations for the two quantization dimensions have been utilized.

To illustrate with an example, such a single-level iteration approach may involve (i) carrying out a first iteration of the functionality for producing and evaluating a candidate quantized version of the deep-learning AI model that utilizes a largest possible scope of the frozen-parameter space that may be selected based on the mechanistic explanations (e.g., ~75% of the total number of parameters in the deep-learning AI model) and a quantization strategy with a highest possible reduced precision level (e.g., FP16), which represents a most-conservative combination of values for the quantization dimensions, and then (ii) during each subsequent iteration of such functionality, utilize either an incrementally-smaller scope of the frozen-parameter space or a quantization strategy with an incrementally-lower reduced precision level (e.g., on an alternating or semi-alternating basis) in order to more aggressively quantize the deep-learning AI model relative to the prior iteration—where the computing platform 102 may continue to initiate new iterations of the functionality for producing and evaluating a candidate quantized version of the deep-learning AI model until either (i) a given iteration of such functionality results in a determination that the candidate quantized version of the deep-learning AI model being produced does not satisfy acceptability criteria, which may serve as a stopping condition for the loop, or (ii) all possible values combinations for the two quantization dimensions have been utilized.

Another possible implementation of such a sequential approach for carrying out iterations of the functionality for producing and evaluating a candidate quantized version of the deep-learning AI model may involve a nested two-level iterative approach that loops over possible values for a first one of the two quantization dimensions (i.e., either the scope of the frozen-parameter space or quantization strategy for reducing the precision level of the unfrozen-parameter space), and for each such value of the first quantization dimension, loops over possible values for a second one of the two quantization dimension. In this respect, the loop for the first quantization dimension may be referred to as the "outer" loop, and the loops for the second quantization dimension may be referred to as "inner" loops or "sub-loops."

To illustrate with a first example where the scope of the frozen-parameter space is the first dimension and the quantization strategy for reducing the precision level of the unfrozen-parameter space is the second dimension, such a nested two-level iteration approach may begin with a first inner loop of iterations of the functionality for producing and evaluating a candidate quantized version of the deep-learning AI model that all utilize a first frozen-parameter space having a first scope (e.g., a largest possible scope of the frozen-parameter space such as ~75% of the total number of parameters in the deep-learning AI model) but utilize different values for the reduced precision level of the quantization strategy, where (i) a first iteration of the first inner loop utilizes a highest possible reduced precision level of the quantization strategy (e.g., FP16), (ii) each subsequent iteration in the first inner loop utilizes an incrementally-lower reduced precision level of the quantization strategy (e.g., int8, int4, etc.), and (iii) the first inner loop terminates when either a given iteration of such functionality results in a determination that the candidate quantized version of the deep-learning AI model being produced does not satisfy acceptability criteria or the lowest possible reduced precision level of the quantization strategy has been reached. In turn, the nested two-level iteration approach may proceed to a second inner loop of iterations of such functionality that all utilize a second frozen-parameter space having a second scope (e.g., a scope that is incrementally smaller and thus more aggressive than the first scope of the first frozen-parameter space) but utilize different values for the reduced precision level of the quantization strategy, a third inner loop of iterations of such functionality that all utilize a third frozen-parameter space having a third scope (e.g., a scope that is incrementally smaller and thus more aggressive than the second scope of the first frozen-parameter space) but utilize different values for the reduced precision level of the quantization strategy, and so on until either a stopping condition is reached with respect to the outer loop or all possible values of the scope of the frozen-parameter space are utilized.

Likewise, to illustrate with a second example where the quantization strategy for reducing the precision level of the unfrozen-parameter space is the first parameter and the scope of the frozen-parameter space is the second parameter, such a nested two-level iteration approach may begin with a first inner loop of iterations of the functionality for producing and evaluating a candidate quantized version of the deep-learning AI model that all utilize a quantization strategy with a first reduced precision level (e.g., a largest possible reduced precision level such as FP16) but utilize different values for the scope of the frozen-parameter space, where (i) a first iteration of the first inner loop utilizes a frozen-parameter space having a largest possible scope (e.g., ~75% of the total number of parameters in the deep-learning AI model), (ii) each subsequent iteration in the first inner loop utilizes an incrementally-smaller frozen-parameter space, and (iii) the first inner loop terminates when either a given iteration of such functionality results in a determination that the candidate quantized version of the deep-learning AI model being produced does not satisfy acceptability criteria or the smallest possible frozen-parameter space has been reached. In turn, the nested two-level iteration approach may proceed to a second inner loop of iterations of such functionality that all utilize a quantization strategy with a second reduced precision level (e.g., a reduced precision level is incrementally lower and thus more aggressive than the first reduced precision level) but utilize different values for the scope of the frozen-parameter space, a third inner loop of iterations of such functionality that all utilize a quantization strategy with a third reduced precision level (e.g., a reduced precision level is incrementally lower and thus more aggressive than the second reduced precision level) but utilize different values for the scope of the frozen-parameter space, and so on until either a stopping condition is reached with respect to the outer loop or all possible values of the reduced precision level are utilized.

The process of cycling through different iterations of the functionality for producing and evaluating a candidate quantized version of the deep-learning AI model in a sequential manner may take various other forms as well, including but not limited to the possibility that the process may not have any stopping condition that causes a loop to terminate prior to the exhaustion of the possible values for the two quantization dimensions and/or that the process may have multiple different types of stopping conditions that could cause a loop to terminate prior to the exhaustion of the possible values for the two quantization dimensions.

As another possibility, the computing platform 102 may be configured to carry out the different iterations of the functionality for producing and evaluating a candidate quantized version of the deep-learning AI model in a parallel (or at least semi-parallel) manner rather than in a sequential manner. For instance, the computing platform 102 may start by defining a set of possible value combinations for the two quantization dimensions (i.e., the scope of the frozen-parameter space and the quantization strategy for reducing the precision level of the unfrozen-parameter space), and may then carry out multiple iterations of the functionality for producing and evaluating a candidate quantized version of the deep-learning AI model utilizing each possible combination of values for the two quantization dimensions in a parallel (or at least semi-parallel) rather than in a sequential manner.

The manner in which the computing platform 102 carries out the different iterations of the functionality for producing and evaluating a candidate quantized version of the deep-learning AI model in order to produce multiple candidate quantized versions of the deep-learning AI model may take other forms as well.

Figure 4:
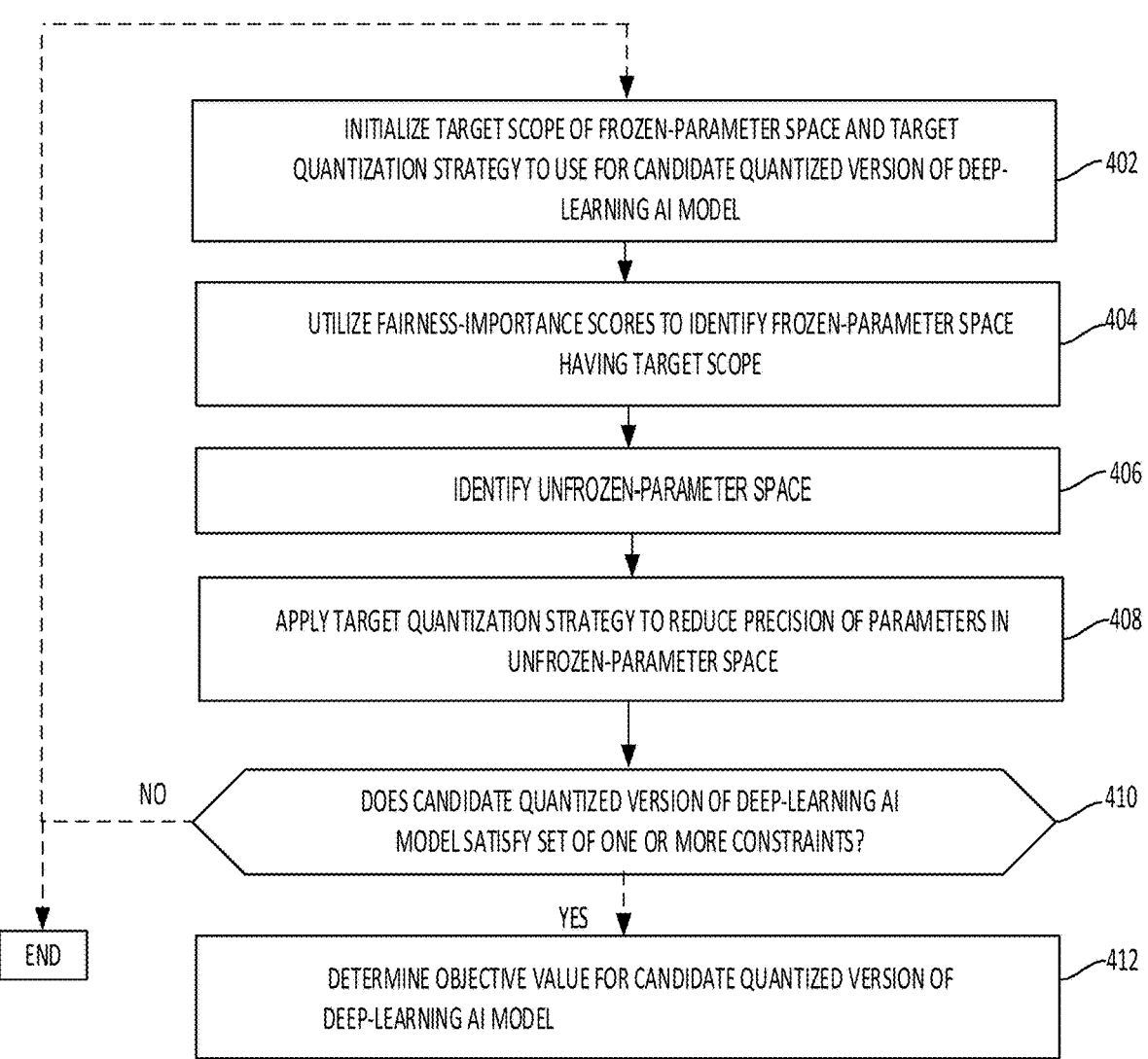
FIG. 4 illustrates one example of the disclosed functionality for generating quantized versions of the deep-learning AI model.

One possible example of the functionality for producing and evaluating a candidate quantized version of the deep-learning AI model that is carried out by the quantization component 306 during the optimization process will now be described with reference to the flow chart of FIG. 4. In practice, the functionality of FIG. 4 may be encoded in the form of program instructions that are executable by one or more processors of a computing platform, and for purposes of illustration, the functionality of FIG. 4 is described as being carried out by the computing platform 102 of FIG. 1 that is hosting the quantization component 306, but it should be understood that the functionality of FIG. 4 may be carried out by any one or more computing platforms that are capable of being installed with software for performing the functions described below. Further, it should be understood that the functionality of FIG. 4 is merely described in this manner for the sake of clarity and explanation and that the example may be implemented in various other manners, including the possibility that functions may be added, removed, rearranged into different orders, combined into fewer blocks, and/or separated into additional blocks depending upon the particular example.

As shown in FIG. 4, functionality for producing and evaluating a candidate quantized version of the deep-learning AI model may begin at block 402 with the computing platform 102 initializing a target scope of the frozen-parameter space and a target quantization strategy to utilize for producing this candidate quantized version of the deep-learning AI model. In this respect, the target scope of the frozen-parameter space and the target quantization strategy for reducing the precision of the unfrozen-parameter space may be selected based on the iterative approach being employed and the current iteration's position within the overall set of iterations to be carried out, among other possibilities.

For instance, if a sequential iterative approach is being employed, then the target scope of the frozen-parameter space and the target reduced quantization strategy for reducing the precision of the unfrozen-parameter space may be selected based on the values of those two quantization dimensions that were utilized for the prior iteration of the functionality of FIG. 4, and more particularly, either (i) the scope of the frozen-parameter space may be changed (e.g., incrementally narrowed) relative to the scope of the frozen-parameter space used for the prior iteration or (ii) the reduced precision level of the quantization strategy for reducing the precision of the unfrozen-parameter space may be changed (e.g., incrementally decreased) relative to the reduced precision level of the quantization strategy used for the prior iteration.

Alternatively, if a parallel (or semi-parallel) iterative approach is being employed, then the target scope of the frozen-parameter space and the target quantization strategy for reducing the precision of the unfrozen-parameter space may be selected from a defined set of possible value combinations for the two quantization dimensions (where value combinations already selected for other iterations are not eligible for selection).

The target scope of the frozen-parameter space and the target quantization strategy for the candidate quantized version of the deep-learning AI model may be selected in various manners as well.

Further, in line with the discussion above, the target scope of the frozen-parameter space and the target quantization strategy that are selected and initialized for the candidate quantized version of the deep-learning AI model may have any of various values, including but not limited to any of the types of values discussed above.

For example, the target scope of the frozen-parameter space could be represented in terms of a percentage of a total number of model parameters of the deep-learning AI model, a count of model parameters to be frozen, or counts of different types of internal aspects of the deep-learning AI model (e.g., layers, sub-layers, components such as attention heads, sub-components such as attention-head parts, and/or computational subgraphs such as circuits) that are to have their associated parameters frozen, and the target quantization strategy could be represented in terms of a particular reduced precision level such as FP16, int8, int4, or the like, among various other possible examples.

The function of initializing the target scope of the frozen-parameter space and the target quantization strategy to utilize for producing this candidate quantized version of the deep-learning AI model may take various other forms as well.

At block 404, the computing platform 102 may utilize the fairness-importance scores that were generated by the fairness-analysis component 304 as a basis for identifying a frozen-parameter space having the target scope for this candidate quantized version of the deep-learning AI model. This functionality may take various forms, which may depend on whether the target scope of the frozen-parameter space is defined in terms of an extent of individual model parameters to freeze or an extent of model-parameter groups to freeze.

For instance, if the target scope of the frozen-parameter space is defined in terms of an extent of individual model parameters to freeze and the fairness-importance scores are generated at an individual parameter level, then the computing platform 102 may (i) utilize such parameter-level fairness-importance scores to rank the model parameters of the deep-learning AI model in order of how much they influence the deep-learning AI model's performance with respect to producing fair model predictions across different demographic groups (where higher fairness-importance scores may indicate greater influence), and then (ii) select a given number of the model parameters that are to be frozen by starting with the top-most parameter in the ranking with the highest fairness-importance score and then proceeding down the ranking of the parameters until the given number of parameters has been selected—where that given number corresponds to the target scope of the frozen-parameter space for this candidate quantized version of the deep-learning AI model (e.g., a given percentage or given count of the model parameters).

Alternatively, if the target scope of the frozen-parameter space is defined in terms of an extent of model-parameter groups to freeze and the fairness-importance scores are generated at a group level (e.g., a layer level, sub-layer level, attention-head level, etc.), then the computing platform 102 may (i) utilize such group-level fairness-importance scores to rank the model-parameter groups of the deep-learning AI model in order of how much they influence the deep-learning AI model's performance with respect to producing fair model predictions across different demographic groups (where higher fairness-importance scores indicate greater influence), and then (ii) select a given number of the model-parameter groups that are to have their parameters frozen by starting with the top-most model-parameter group in the ranking with the highest group-level fairness-importance score and then proceeding down the ranking of the model-parameter groups until the given number of model-parameter groups has been selected—where that given number corresponds to the target scope of the frozen-parameter space for this candidate quantized version of the deep-learning AI model (e.g., a given percentage or given count of model layers, model sub-layers, etc.).

To illustrate with a first example where the model-parameter groups comprise layer-level groups of model parameters for the 12 decoder layers of a GPT-2 small LLM, the computing platform 102 may rank the layer-level groups of model parameters for the 12 decoder layers in order of their fairness-importance scores and then select some number of layer-level groups of model parameters to freeze from the top of the ranking (e.g., the top 1, top 2, top 3, etc.).

To illustrate with a second example where the model-parameter groups comprise sub-layer-level groups of model parameters for the 12 multi-head attention sub-layers and 12 MLP sub-layers of a GPT-2 small LLM, the computing platform 102 may rank the sub-layer-level groups of model parameters for the 24 total sub-layers in order of their fairness-importance scores and then select some number of sub-layer-level groups of model parameters to freeze from the top of the ranking (e.g., the top 3, top 5, etc.).

To illustrate with a third example where the model-parameter groups comprise attention-head-level groups of model parameters for the 144 individual attention heads of a GPT-2 small LLM, the computing platform 102 may rank the attention-head-level groups of model parameters for the 144 individual attention heads in order of their fairness-importance scores and then select some number of attention-head-level groups of model parameters to freeze from the top of the ranking (e.g., the top 5, top 10, top 15, etc.).

Various other examples of model-parameter groups that may be evaluated and selected may be possible as well, including but not limited to groups of model parameters for other internal aspects of the deep-learning AI model (e.g., attention-head parts, computational subgraphs, etc.)

Further, in practice, the computing platform 102 could function to select model-parameter groups to freeze for internal aspects of the deep-learning AI model at either a single level of granularity or multiple different levels of granularity of the deep-learning AI model (if group-level fairness-importance scores are generated for select model-parameter groups multiple different levels of granularity), such as model-parameter groups for any combination of two or more of (i) layers, (ii) multi-head attention sub-layers, (iii) MLP layers, (iv) attention heads, (v) component parts of attention heads, and/or (vi) computational subgraphs, among other possibilities.

The functionality for utilizing the fairness-importance scores as a basis for identifying the frozen-parameter space having the target scope for this candidate quantized version of the deep-learning AI model may take other forms as well.

At block 406, after identifying the frozen-parameter space for the candidate quantized version of the deep-learning AI model, the computing platform 102 may next identify an unfrozen-parameter space for the candidate quantized version of the deep-learning AI model, which may comprise whichever of the model parameters for the deep-learning AI model are not included in the frozen-parameter space that is identified for this candidate quantized version of the deep-learning AI model. In other words, the computing platform 102 may identify the unfrozen-parameter space to be the complement of the frozen-parameter space with respect to the full parameter space of the deep-learning AI model.

However, the unfrozen-parameter space that is identified for the candidate quantized version of the deep-learning AI model could take other forms as well, including but not limited to the possibility that, in addition to the frozen-parameter space that is identified based on the fairness-importance scores, there are other model parameters of the deep-learning AI model that are to have their precision frozen during quantization and may thus be excluded from the unfrozen-parameter space. For instance, the deep-learning AI model may exclude certain model parameters that are not to have their precision reduced regardless of the scenario, such as model parameters associated with certain internal aspects of the deep-learning AI model that are included on a "whitelist" or the like (e.g., model parameters associated with layer normalization steps, the final output layer, input embeddings, etc.), in which case these model parameters may additionally be excluded from the unfrozen-parameter space.

At block 408, the computing platform 102 may produce the candidate quantized version of the deep-learning AI model by applying the target quantization strategy that is initialized for this candidate quantized version of the deep-learning AI model in order to reduce the precision of the numerical parameters in the unfrozen-parameter space identified for this candidate quantized version of the deep-learning AI model from their full precision level to the reduced precision level.

In practice, the function of reducing the precision of the numerical parameters in the unfrozen-parameter space identified for this candidate quantized version of the deep-learning AI model from their full precision level to the reduced precision level may generally involve (i) copying the unfrozen parameters, (ii) converting the unfrozen parameters to the reduced precision level (which could involve operations such as scaling, calibration, and/or zero-point calculation that are either performed prior to the conversion or performed during the course of the conversion process), and then (iii) storing the converted values in data storage. In this respect, the target quantization strategy may employ any suitable quantization technique now known or later developed for converting the unfrozen parameters to the reduced precision level, including but not limited to static quantization techniques and/or dynamic quantization techniques. Further, in line with the discussion above, it is possible that the target quantization strategies that are initialized for different iterations of the quantization functionality could employ different types of quantization techniques.

The function of applying the target quantization strategy that is initialized for this candidate quantized version of the deep-learning AI model in order to reduce the precision of the numerical parameters in the unfrozen-parameter space from their full precision level to the reduced precision level may take other forms as well.

At block 410, the computing platform 102 may next evaluate whether the candidate quantized version of the deep-learning AI model produced at block 408 satisfies a set of one or more constraints that are defined for the optimization process. This function could take any of various forms, which may depend on the form of the one or more constraints.

As one possibility, the set of one or more constraints may include at least one constraint related to the size of the quantized version of the deep-learning AI model, such as a constraint requiring a given type of metric for quantifying the size of the quantized version of the deep-learning AI model to be less than (or at least equal to) a defined threshold. In this respect, the given type of metric for quantifying the size of the deep-learning AI model may include a metric that indicates a model's on-disk storage footprint or a model's memory footprint, among other possible types of metrics for quantifying the size of the quantized version of deep-learning AI model. In turn, the defined threshold may comprise a value represented in terms of the given type of metric that serves as a defined cutoff for determining whether the size of the quantized version of the deep-learning AI model is acceptable (e.g., an on-disk storage footprint threshold, a memory footprint threshold, etc.).

In an implementation where the set of one or more constraints include a constraint related to on-disk storage footprint, the computing platform 102 may evaluate whether the candidate quantized version of the deep-learning AI model satisfies that condition by (i) determining the file size of the initial candidate quantized version of the deep-learning AI model after it has been saved to disk, and (ii) determining whether the file size is less than (or at least equal to) a defined threshold for on-disk storage size. On the other hand, in an implementation where the set of one or more constraints include a constraint related to memory footprint, the computing platform 102 may evaluate whether the candidate quantized version of the deep-learning AI model satisfies that constraint by (i) running the initial candidate quantized version of the deep-learning AI model using test records that each includes a respective model input, (ii) for each run, measuring an amount of memory (e.g., RAM or VRAM) consumed by the initial candidate quantized version of the deep-learning AI model, (iii) aggregating the measured amount of memory consumed across the runs (e.g., by taking an average of the measured values), and (iv) determining whether the aggregated value is less than (or at least equal to) a defined threshold for memory footprint.

As another possibility, the set of one or more constraints may include at least one constraint related to the predictive accuracy of the quantized version of the deep-learning AI model, such as a condition requiring a given type of metric for quantifying the predictive accuracy of the quantized version of the deep-learning AI model (e.g., the true positive rate across demographic groups, which may be defined by the setup component 302 discussed above) to be greater than (or at least equal to) a defined threshold. In this respect, the given type of metric for quantifying the predictive accuracy of the deep-learning AI model may include an accuracy metric that indicates what percentage of the model's predictions are considered to be correct, an exact match (EM) metric that indicates what percentage of the model's predictions match exactly with a ground-truth value, a precision metric that indicates how many of the model's predictions are correct, a recall metric that indicates how many of the correct responses were predicted by the model, an F1 metric that represents a harmonic mean of the precision and recall metrics, and/or a performance-loss metric that indicates how the prediction accuracy has degraded relative to the original version of the deep-learning AI model (e.g., a mean-squared error metric), among other possible types of metrics for quantifying the predictive accuracy of the quantized version of deep-learning AI model. In turn, the defined threshold may comprise a value represented in terms of the given type of metric (e.g., a percentage value for an accuracy or EM metric, a count value for a precision or recall metric, etc.) that serves as a defined cutoff for determining whether the predictive accuracy of the quantized version of the deep-learning AI model is acceptable.

In such an implementation where the set of one or more constraints include at least one constraint related to the predictive accuracy of the quantized version of the deep-learning AI model, the computing platform 102 may evaluate whether the candidate quantized version of the deep-learning AI model satisfies that constraint by (i) running the candidate quantized version of the deep-learning AI model using test records that each includes a respective model input and perhaps also a corresponding ground-truth value for the model output, (ii) comparing the predictions output by the candidate quantized version of the deep-learning AI model for the test records to either the corresponding ground-truth values or the output of the original version of the deep-learning AI model, (iii) based on the comparison, computing a value for a given type of metric that quantifies the predictive accuracy of the quantized version of the deep-learning AI model, and (iv) determining whether the computed value for the given type of metric is greater than (or at least equal to) a defined threshold for predictive accuracy.

As another possibility, the set of one or more constraints may include at least one constraint related to the prediction time of the quantized version of the deep-learning AI model, such as a condition requiring a given type of metric for quantifying the prediction time of the quantized version of the deep-learning AI model to be less than (or at least equal to) a defined threshold. In this respect, the given type of metric for quantifying the prediction time of the deep-learning AI model may include a metric that indicates prediction time on a per-token basis (e.g., number of milliseconds per token) or a metric that indicates prediction time on a per-response basis (e.g., duration of time to respond to a prompt), among other possible types of metrics for quantifying the predictive time of the quantized version of deep-learning AI model. In turn, the defined threshold may comprise a value represented in terms of the given type of metric (e.g., a duration of time per token or per response) that serves as a defined cutoff for determining whether the predictive time of the quantized version of the deep-learning AI model is acceptable.

In such an implementation where the set of one or more constraints include at least one constraint related to the prediction time of the quantized version of the deep-learning AI model, the computing platform 102 may evaluate whether the candidate quantized version of the deep-learning AI model satisfies that constraint by (i) running the candidate quantized version of the deep-learning AI model using test records that each includes a respective model input, (ii) for each run, measuring a value for a given type of metric that quantifies the predictive time of the candidate quantized version of the deep-learning AI model, (iii) aggregating the measured values for the given type of metric across the runs (e.g., by taking an average of the measured values), and (iv) determining whether the aggregated value for the given type of metric is less than (or at least equal to) a defined threshold for prediction time.

The set of one or more constraints may comprise constraints that are based on various other types of metrics for quantifying the performance of a deep-learning AI model as well, examples of which may include an ELO score, a perplexity score, a massive multitask language understanding (MMLU) score, a HumanEval score, and/or a human-assigned score related to faithfulness, completeness, or minimality, among other possible types of metrics for quantifying the performance of a deep-learning AI model.

Further, in practice, the set of one or more constraints may comprise either a single one of the foregoing types of conditions or a combination of multiple of the foregoing types of conditions (e.g., conditions related to two or more predictive accuracy, prediction time, on-disk storage footprint, memory footprint, etc.).

The function of evaluating whether the candidate quantized version of the deep-learning AI model that is produced at block 408 satisfies the set of one or more constraints may take various other forms as well.

If the computing platform 102 determines at block 410 that the candidate quantized version of the deep-learning AI model fails to satisfy the set of one or more constraints, then the computing platform 102 may discard the candidate quantized version of the deep-learning AI model produced at block 408 and either (i) proceed to a next iteration of the functionality for producing and evaluating a candidate quantized version of the of the deep-learning AI model or (ii) end the optimization process if a stopping condition has been reached.

On the other hand, if the computing platform 102 determines at block 410 that the candidate quantized version of the deep-learning AI model produced at block 408 satisfies the set of one or more constraints, then at block 412, the computing platform 102 may determine an objective value for the candidate quantized version of the deep-learning AI model that is to be utilized to compare the candidate quantized version against other candidate quantized versions. In accordance with the present disclosure, the objective value may quantify the "loss" of the candidate quantized version of the deep-learning AI model in terms of both (i) prediction error (i.e., degradation in prediction accuracy) and (ii) fairness-performance error. Such an objective value may take any of various forms and be determined in any of various manners.

As one possibility, the objective value for any given candidate quantized version of the deep-learning AI model may be determined using the following objective function:

$$\text{Objective Value } (Q) = E_{quant}(Q) + \alpha \cdot E_{fair}(Q),$$

where Objective Value (Q) denotes the objective value that is determined for a given candidate quantized version Q of the deep-learning AI model, $E_{quant}(Q)$ denotes the prediction error of the given candidate quantized version Q, $E_{fair}(Q)$ denotes the fairness error of the given candidate quantized version Q, and a represents a fairness-balancing coefficient. Each of these components may take various forms.

To begin, the prediction error term of the objective function may comprise any of various types of functions that quantify the prediction error of the candidate quantized version of the deep-learning AI model, including functions that quantify the prediction error relative to ground-truth labels and functions that quantify the prediction error relative to the original version of the deep-learning AI model. In one example implementation, the prediction error term may comprise a function for determining the mean-squared difference between the predictions output by the candidate quantized version of the deep-learning AI model and the predictions output by the original version of the deep-learning AI model, which may reflect the degradation in prediction accuracy resulting from quantization. It should be understood that the prediction error term may take various other forms as well.

Further, the fairness error term of the objective function may comprise any of various types of functions that quantify the fairness error of the candidate quantized version of the deep-learning AI model, including functions that quantify the fairness error relative to ground-truth labels and functions that quantify the fairness error relative to the original version of the deep-learning AI model. In one example implementation, the fairness performance error term may comprise a function that quantifies the disparity in false negative rates—i.e., the proportion of positive prediction results incorrectly predicted as negative-across different demographic groups between the candidate quantized version of the deep-learning AI model and the original deep-learning AI model. In this respect, the fairness error term may represent the cumulative disparity in false negative rates observed across all demographic groups, and thereby capture the extent to which quantization may impact the candidate quantized version's ability to produce fair prediction results.

As another example implementation, the fairness error term may comprise a function that quantifies the disparity in true positive rates—i.e., the proportion of positive prediction results correctly predicted as positive-across different demographic groups between the candidate quantized version of the deep-learning AI model and the original deep-learning AI model. In this respect, the fairness error term may represent the cumulative disparity in true positive rates observed across all demographic groups, and thereby capture the extent to which quantization may impact the candidate quantized version's ability to produce fair prediction results.

The fairness error term may take various other forms as well.

Further yet, the fairness-balancing coefficient may comprise a numeric value that controls how much the fairness error factors into the objective value. That fairness-balancing coefficient value may take various forms, which may depend on fairness objectives (e.g., objectives aimed at mitigating potential biases against underrepresented demographic groups). For instance, a higher fairness-balancing coefficient value (e.g., a value greater than 1) may increase the contribution of fairness error to the objective value, and thus place greater emphasis on producing fair prediction results across different demographic groups. In contrast, a lower fairness-balancing coefficient value (e.g., a value less than 1) may decrease the contribution of fairness error to the objective value, and thus place less emphasis on producing fair prediction results across different demographic groups.

It should be understood that the objective value may take various other forms as well, including but not limited to the possibility that the objective value may account for other types of errors and/or balancing coefficients depending on optimization objectives.

After determining the objective value for the candidate quantized version of the deep-learning AI model, the computing platform 102 may also optionally adjust, transform, or otherwise modify the objective value in some manner. For instance, the computing platform 102 may optionally transform the objective value by applying an inverse mapping function or the like, such that a higher objective value indicates better performance rather than worse performance. Other examples are possible as well.

The function of determining the objective value for the candidate quantized version of the deep-learning AI model may take various other forms as well.

After determining the objective value for the candidate quantized version of the deep-learning AI model produced at block 412, the computing platform 102 may then proceed in one of a few different ways depending on the implementation of the optimization processed.

For instance, in implementations where a sequential, stateful iterative approach is being employed for producing candidate quantized versions of the deep-learning AI model, the computing platform 102 may compare the objective value for the candidate quantized version of the deep-learning AI model produced at block 412 to an objective value that was previously determined for the current "best" candidate quantized version of the deep-learning AI model produced during a prior iteration of the optimization process (unless this is the first iteration, in which case the computing platform 102 simply elects the candidate quantized version of the deep-learning AI model produced at block 408 as the current best candidate). Based on this comparison, the computing platform 102 may either (i) determine that the objective value for the candidate quantized version of the deep-learning AI model produced at block 412 is better (e.g., represents lower error) than the objective value for the current best candidate quantized version of the deep-learning AI model, in which case the computing platform 102 may elect the candidate quantized version of the deep-learning AI model produced at block 412 as the new current best candidate and discard the prior candidate quantized version that was previously considered to be the current best candidate, or (ii) determine that the objective value for the candidate quantized version of the deep-learning AI model produced at block 412 is better (e.g., represents lower error) than the objective value for the current best candidate quantized version of the deep-learning AI model, in which case the computing platform 102 may discard the candidate quantized version of the deep-learning AI model produced at block 412 and keep the current candidate quantized version of the deep-learning AI model as is. And in turn, the computing platform 102 may either (i) proceed to a next iteration of the functionality for producing and evaluating a candidate quantized version of the of the deep-learning AI model or (ii) end the optimization process if a stopping condition has been reached.

The foregoing implementations may be represented in terms of a minimization function, where the computing platform 102 functions to iterate through different candidate quantization versions of the deep-learning AI model while attempting to minimize an objective value that is defined in terms of both prediction error and fairness error. In this respect, the stopping condition for the optimization process may take any of various forms, examples of which may include a budget constraint for the optimization process (e.g., based on number of iterations, memory, latency, or the like), a condition related to the objective values of the candidate quantized versions of the deep-learning AI model, or a condition related to some other characteristic of the candidate quantized versions of the deep-learning AI model (e.g., size), among other possible forms of stopping conditions.

On the other hand, in implementations where a parallel iterative approach is being employed for producing candidate quantized versions of the deep-learning AI model, the computing platform 102 may wait until all of the iterations of the foregoing functionality of FIG. 4 have been completed and all of the objective values have been determined, and may then perform a single comparison of the objective values at that time in order to determine which of the candidate quantized versions of the deep-learning AI model has the best objective value (e.g., the value representing the lowest error).

The optimization process that is carried out by the quantization component 306—including the functionality for producing and evaluating a candidate quantized version of the deep-learning AI model—may take various other forms , After the optimization process has concluded, the best candidate version of the deep-learning AI model resulting from the optimization process (i.e., the candidate with the best objective value) may then be selected by the quantization component 306 as a final quantized version of the deep-learning AI model that is to be deployed in place of the original version of the deep-learning AI model, and the quantization component 306 may pass that final quantized version of the deep-learning AI model to the adapter-configuration component 308.

The functionality of the quantization component 306 may take other forms as well.

With continued reference to FIG. 3, the adapter-configuration component 308 may generally function to update the final quantized version of the deep-learning AI model (i.e., the best candidate quantized version of the deep-learning AI model) so as to further improve the performance of the final quantized version of the deep-learning AI model with respect to producing fair prediction results across different demographic groups. This function of updating the final quantized version of the deep-learning AI model may take various forms.

As one possibility, the function of updating the final quantized version of the deep-learning AI model may involve applying a LoRA technique to fine-tune the final quantized version of the deep-learning AI model. In line with the discussion above, LoRA may generally involve introducing small, trainable low-rank matrices into specific layers (e.g., an attention sub-layer) of the final quantized version of the deep-learning AI model, while the quantized parameters remain frozen. This fine-tuning process may seek to minimize an overall loss function that balances multiple objectives, such as model accuracy and fairness objectives (e.g., reducing disparities across different demographic groups), by restricting gradient updates to low-rank matrices (while keeping the quantized parameters frozen). In this way, LoRA enables the final quantized version of the deep-learning AI model to be fine-tuned without requiring retraining or re-quantization of the original version of the deep-learning AI model to maintain computational efficiency.

At a high level, the overall loss function may quantify the total error of the prediction results output by the final quantized version of the deep-learning AI model and may serve as a guide for fine-tuning the final quantized version of the deep-learning AI model. Generally speaking, this fine-tuning process aims to enhance model performance while preserving fairness. In some implementations, the overall loss function may comprise two main components: (i) a task loss component that may measure how well the final quantized version of the deep-learning AI model performs on its primary objective, and (ii) a penalty loss component that may quantify the extent to which the final quantized version of the deep-learning AI model violates fairness objectives in reducing disparities across different demographic groups. Formulaically speaking, the overall loss function may be expressed as:

$$\mathcal{L}_{total} = \mathcal{L}_{task} + \lambda \cdot \mathcal{L}_{penalty},$$

where $\mathcal{L}_{total}$ denotes the total loss, $\mathcal{L}_{task}$ denotes the task loss component, $\mathcal{L}_{penalty}$ denotes the penalty loss component, and $\lambda$ denotes the penalty coefficient (which may be set as part of one of the fine-tuning settings as previously discussed).

In line with the discussion above, the penalty coefficient may determine the relative influence of the penalty loss component compared to the task loss component within the overall loss function that the final quantized version of the deep-learning AI model seeks to minimize. For instance, a higher penalty coefficient value (e.g., $\lambda > 1$) may increase the weight of the penalty loss component to focus more on fairness (e.g., reducing disparities across underrepresented groups) at the potential expense of model accuracy. In contrast, a low penalty coefficient (e.g., $\lambda < 1$) may reduce the influence of the penalty loss component, thereby prioritize model accuracy over fairness. Accordingly, setting an appropriate penalty coefficient may be essential for accomplishing the desired balance between model prediction accuracy and fairness.

During the fine-tuning process, the adapter-configuration component 308 may monitor convergence with respect to both prediction accuracy and fairness metrics. If fairness objectives are not satisfied, the adapter-configuration component 308 may initiate additional fine-tuning iterations which may involve gradient updates to the low-rank matrices introduced into specific layers of the final quantized version of the deep-learning AI model (while keeping the quantized parameters frozen) and/or adjusting the penalty coefficient ($\lambda$) to satisfy such fairness objectives.

The function of updating the final quantized version of the deep-learning AI model may take various other forms as well, examples of which may include pruning, knowledge distillation, alignment with reinforcement learning techniques, and/or optimization for performance (e.g., modifications such that inference on specific hardware is faster), among other possible ways in which the final quantized version of the deep-learning AI model could be updated.

Further, the functionality of the adapter-configuration component 308 may take other forms as well.

After updating the final quantized version of the deep-learning AI model is updated, it may then be passed to the deployment component 310.

With continued reference to FIG. 3, the deployment component 310 may generally function to deploy the final quantized version of the deep-learning AI model that has been updated (referred to herein as the "deployed model" for simplicity) for execution by the computing platform 102 (and/or some other computing platform). The deployed model may thereafter be utilized to render predictions of a given type for individuals or other entities from different demographic groups (e.g., demographic groups based on based on gender, race, age, sexual orientation, religion, marital status, etc.). In some implementations, the computing platform 102 (and/or some other computing platform) may execute the deployed model by providing input records for individuals or other entities from different demographic groups that give rise to fairness concerns and thereby enabling the updated final quantized version of the deep-learning AI model to render predictions of the given type for such individuals or other entities.

As one possible example to illustrate, the deployed model may function to render predictions related to whether a financial institution should extend a particular type of service (e.g., a financial service such as a loan, a credit card account, a bank account, mortgage, or the like) to individuals or other entities, where such predictions may take the form of classification scores (e.g., likelihood values) that are compared against a classification threshold in order to render binary decisions of whether or not the financial institution should extend the particular type of service to such individuals or other entities.

The deployed model may be configured to render predictions of various other types as well.

In practice, certain entities, such as financial institutions, may require deployment of models within their own infrastructure (e.g., bank data centers, private cloud environments, etc.) to comply with various privacy, security, and/or regulatory requirements. Accordingly, the deployment component 310 may function to support on-premise deployment and/or hybrid deployment of the final quantized version of the deep-learning AI model that has been updated. In this regard, on-premise deployment may involve packaging the deployed model as a microservice or containerized application for integration with a given entity's existing systems. Hybrid deployment may involve deployment of the deployed model within a hybrid-cloud architecture, where sensitive data processing may remain on-premise, while less sensitive data processing may be handled in a cloud environment to provide scalability.

It should be understood that additional security measures may also be implemented during deployment and/or execution of the deployed model. For instance, such security measures may include encryption of data in transit and/or at rest, user authentication, access control, and isolation of the model environment to prevent unauthorized access.

Further, in practice, because the deep-learning AI model has been quantized to reduce its size and memory footprint, the computing platform 102 (and/or some other computing platform) may execute multiple instances of the deployed model in parallel rather than a single instance. Generally speaking, parallel execution may enable high-throughput process of large volumes of prediction requests without degrading performance. For example, tens of thousands of instances of the deployed model may be executed concurrently in parallel to render predictions related to whether a financial institution should extend a particular type of service (e.g., a financial service such as a loan, a credit card account, a bank account, or the like) to individuals or other entities.

In some implementations, parallel execution may be managed by spawning multiple worker processes and/or threads and distributing incoming prediction requests across these worker processes and/or threads. In practice, the computing platform 102 (and/or some other computing platform) may monitor system metrics (e.g., CPU/GPU utilization, memory usage, response times) and dynamically allocate resources (or trigger autoscaling in a cloud environment) to worker processes and/or threads depending on the number of prediction requests. This may ensure that latency requirements that may be critical to real-time applications are satisfied. For instance, if the number of prediction requests increases or remains high, the computing platform 102 may allocate more CPU/GPU resources to existing worker processes and/or threads, or spawn additional worker processes and/or threads. On the other hand, if the number of prediction requests decreases or remains low, the computing platform 102 may allocate less CPU/GPU resources to existing worker processes, or scale down the number of worker processes and/or threads.

Further, in some implementations, the computing platform 102 (and/or some other computing platform) may function to record each prediction result with metadata, such as a unique identifier, timestamp, input reference, and/or "explanation" for the prediction result—which may be produced using any of various explainability techniques (e.g., Shapley Additive explanations (SHAP), Local Interpretable Model-agnostic Explanations (LIME), etc.). Such information may serve various purposes, examples of which may include supporting compliance auditing, troubleshooting model behavior, generating usages reports, summarizing model activity (e.g., number of inferences, decision distributions, etc.), supporting version control of deployed models, among various other purposes.

Further yet, in some implementations, the computing platform 102 (and/or some other computing platform) may provide the prediction results (either in real-time or in scheduled batches)—perhaps with metadata, such as a demographic group identifier of each individual or other entity—to the monitoring component 312 described below. The prediction results may be analyzed thereafter to ensure that fairness across different demographic groups is maintained (e.g., approvals for a certain demographic group are not disproportionately declining over time). In turn, the deployed model may be updated to ensure that fairness objectives (e.g., objectives aimed at mitigating potential biases against underrepresented demographic groups) are satisfied.

The functionality of the deployment component 310 may take other forms as well.

With continued reference to FIG. 3, the monitoring component 312 generally functions to ensure that fairness objectives remain satisfied after deploying the final quantized version of the deep-learning AI model that has been updated (e.g., fine-tuned) even as conditions change over time (evolving regulatory standards and/or demographic shifts, etc.). At a high level, the monitoring component 312 may function to (i) evaluate the deployed model's prediction results to determine fairness metrics (e.g., true positive, false positive, false negative rates, etc.) for each demographic group, (ii) based on the evaluation, (a) determine whether any fairness metric violates a predefined threshold or otherwise deviates significantly from a baseline value and, (b) if so, generate an alert indicating that the deployed model needs to be updated, and/or (iii) create and maintain records memorializing the determined fairness metrics, generated alerts, and/or any corresponding responses to the generated alerts. Each of these functions may take various forms.

For instance, as previously discussed, the computing platform 102 (and/or some other computing platform) may provide the prediction results of the deployed model either in real-time or in scheduled batches to the monitoring component 312. In turn, the monitoring component 312 may evaluate the prediction results to determine fairness metrics for each demographic group. This function may take various forms.

As one possibility, based on the provided prediction results of the deployed model, the monitoring component 312 may determine certain fairness metrics for each demographic group, such as the true positive rates, false negative rates, false positive rates, and/or selection rates (e.g., the proportion of positive predictions for the demographic group). These determined fairness metrics may then be compared against the baseline fairness metrics for each demographic group (which may be obtained from the fairness-analysis component 304 discussed above) and/or predefined thresholds.

As one example to illustrate, if the deployed model renders predictions related to whether a financial institution should extend a particular type of service (e.g., a financial service such as a loan, a credit card account, a bank account, or the like) to individuals or other entities, the monitoring component 312 may compare the true positive rate for a given demographic group to a predefined approval rate (e.g., 80%) to determine whether the deployed model continues to satisfy fairness objectives.

As another example to illustrate, the monitoring component 312 may evaluate disparities in error rates (e.g., differences in false positive and/or false negative rates between demographic groups) and determine whether such disparities remain within an acceptable threshold.

Evaluating the prediction results of the deployed model may take various other forms as well.

It should be understood that the monitoring component 312 may evaluate the prediction results and determine fairness metrics across at various times (e.g., periodically or continuously in real time), which may depend on how the prediction results are provided to the monitoring component 312.

Based on the evaluation, if any of the fairness metrics (e.g., true positive rates, false negative rates, false positive rates, and/or selection rates) for a given demographic group violates a predefined threshold or otherwise deviates significantly from a baseline value, the monitoring component 312 may function to generate an alert indicating that the deployed model needs to be updated. The generated alert may then trigger one or more actions that may take various forms.

As one possibility, the generated alert may trigger communications with one or more other software components of the example software-based pipeline 300 (e.g., the setup component 302, the fairness-analysis component 304, the quantization component 306, and/or the adapter-configuration component 308), and the deployed model may be updated thereafter in accordance with the example software-based pipeline 300. For instance, the monitoring component 312 may communicate with (i) the setup component 302 to modify certain configuration settings (e.g., the attribute selection setting, the quantization settings, the fine-tuning settings, etc.) that may in turn influence the behavior of an updated quantized version of the deep-learning AI model that is being created and deployed, (ii) the quantization component 306 to adjust the quantized parameters (e.g., precision levels) and identify a new best candidate quantized version of the deep-learning AI model, which may in turn be fine-tuned and deployed, and/or (iii) the adapter-configuration component to further fine-tune the finalized quantized version of the deep-learning AI model. In this way, the computing platform 102 may implement a feedback loop from the monitoring component 312 to one or more other software components of the example software-based pipeline 300 to maintain model prediction accuracy and fairness objectives.

As another possibility, the generated alert may trigger communications with a client station associated with a given user (e.g., a compliance officer, data scientist, etc.) to notify the given user that the deployed model needs to be updated. The given user may then approve or initiate one or more actions to update the deployed model (which may involve modifying the configuration settings, adjusting the quantized parameters, further fine-tuning the finalized quantized version of the deep-learning AI model, etc.) and ensure that model prediction accuracy and fairness objectives are satisfied.

The generated alert may trigger various other actions as well.

In line with the discussion above, the monitoring component 312 may further function to create and maintain records of the determined fairness metrics, generated alerts, and/or any corresponding responses to generated alerts discussed above. Such records may generally provide an audit trail for internal reviews or external regulatory audits to verify compliance with fairness objectives. For example, the computing platform 102 may utilize the created record to (i) generate compliance reports summarizing the deployed model's performance (e.g., a weekly report indicating no significant disparity between demographic groups in the prediction results), and/or (ii) flag instances where generated alerts triggered model updates (e.g., "Model updated at time T due to drift in false positive rates for demographic group G").

The functionality of the monitoring component 312 may take other forms as well.

The example software-based pipeline 300 described above could take other forms. For instance, as one possibility, the example software-based pipeline 300 may include other components that are not shown or described above but may nevertheless facilitate the functionality disclosed herein. As another possibility, certain of the components shown and described above could be combined together or separated out into multiple sub-components. As yet another possibility, certain of the components shown and described above may perform additional or different functionality from what is described above. Other variations of the example software-based pipeline 300 are possible as well.

Further, as noted above, it is possible that the components of the example software-based pipeline 300 could be distributed across multiple different computing platforms. For instance, as one possibility, the deployment and monitoring components of the example software-based pipeline 300 could be hosted on a separate computing platform from the rest of the components of the example software-based pipeline 300 (e.g., in a scenario where the creation and deployment of the deep-learning AI model is distributed between different computing platforms). Other arrangements of the components of the example software-based pipeline 300 are possible as well.

One possible example of functionality 500 that may be carried out in accordance with the disclosed technology will now be described with reference to the flow chart of FIG. 5. In practice, the functionality 500 of FIG. 5 may be encoded in the form of program instructions that are executable by one or more processors of a computing platform, and for purposes of illustration, the functionality 500 of FIG. 5 is described as being carried out by the computing platform 500 of FIG. 5, but it should be understood that the functionality 500 of FIG. 5 may be carried out by any one or more computing platforms that are capable of being installed with software for performing the functions described below. Further, it should be understood that the functionality 500 of FIG. 5 is merely described in this manner for the sake of clarity and explanation and that the example may be implemented in various other manners, including the possibility that functions may be added, removed, rearranged into different orders, combined into fewer blocks, and/or separated into additional blocks depending upon the particular example.

Starting at block 502, the computing platform 500 may, for a deep-learning AI model, determine a respective fairness-importance score of a respective parameter for at least a subset of the deep-learning AI model's parameters that quantifies how much the respective parameter influences generating fair predictions across a plurality of demographic groups.

At block 504, the computing platform 500 may carry out an optimization process that produces and evaluates different quantized versions of the deep-learning AI model that each differ from one another with respect to one or both of (i) which group of the deep-learning AI model's parameters had their precision frozen during quantization, wherein the group of the deep-learning AI model's parameters had their precision frozen during quantization is determined based on the fairness-importance scores, and (ii) which quantization strategy was utilized to reduce a precision of the deep-learning AI model's parameters that did not have their precision frozen during quantization.

At block 506, the computing platform 500 may, based on the optimization process, select a given quantized version of the deep-learning AI model for deployment.

At block 508, the computing platform 500 may fine-tune the given quantized version of the deep-learning AI model.

In turn, at block 510, after fine-tuning the given quantized version of the deep-learning AI model, the computing platform 500 may deploy the given quantized version of the deep-learning AI model.

Figure 6:
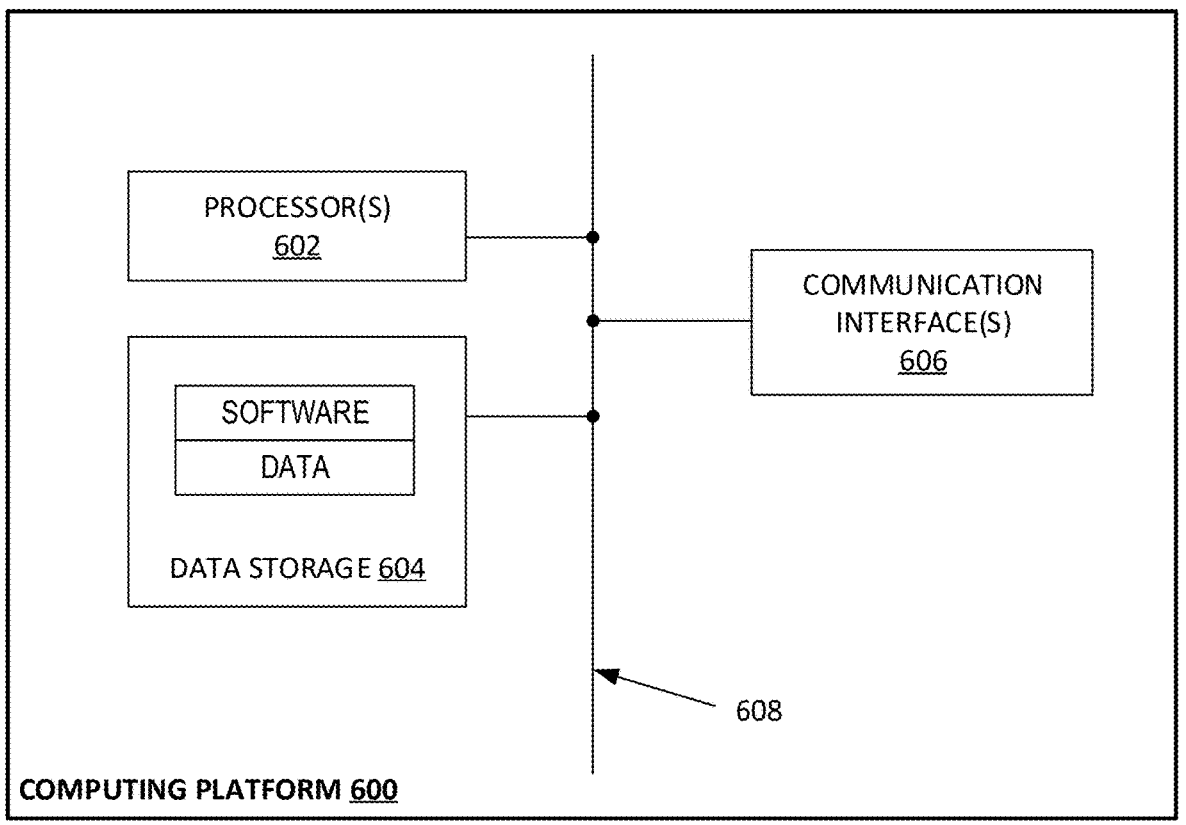
FIG. 6 illustrates a simplified block diagram that illustrates some structural components of an example computing platform that may be configured to carry out any of the various functions disclosed herein.

Turning now to FIG. 6, a simplified block diagram is provided to illustrate some structural components that may be included in an example computing platform 600 that may be configured to perform the platform-side functions disclosed herein. At a high level, the example computing platform 600 may generally comprise any one or more computing systems (e.g., one or more servers) that collectively include one or more processors 602, data storage 604, and one or more communication interfaces 606, each of which may be communicatively linked by a communication link 608 that may take the form of a system bus, a communication network such as a public, private, or hybrid cloud, or some other connection mechanism. Each of these components may take various forms.

For instance, the one or more processors 602 may comprise one or more processor components, such as one or more central processing units (CPUs), graphics processing units (GPUs), application-specific integrated circuits (ASICs), digital signal processor (DSPs), and/or programmable logic devices such as field programmable gate arrays (FPGAs), among other possible types of processing components. In line with the discussion above, it should also be understood that the one or more processors 602 could comprise processing components that are distributed across a plurality of physical computing devices connected via a network, such as a computing cluster of a public, private, or hybrid cloud.

In turn, the data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, the data storage 604 may be capable of storing both (i) program instructions that are executable by the one or more processors 602 such that the example computing platform 600 is configured to perform any of the various functions disclosed herein (including but not limited to any of the platform-side functions discussed above), and (ii) data that may be received, derived, or otherwise stored by the example computing platform 600.

The one or more communication interfaces 606 may comprise one or more interfaces that facilitate communication between the example computing platform 600 and other systems or devices, where each such interface may be wired and/or wireless and may communicate according to any of various communication protocols. As examples, the one or more communication interfaces 606 may include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the example computing platform 600 may additionally have an Input/Output (I/O) interface that includes or provides connectivity to I/O components that facilitate user interaction with the example computing platform 600, such as a keyboard, a mouse, a trackpad, a display screen, a touch-sensitive interface, a stylus, a virtual-reality headset, and/or one or more speaker components, among other possibilities.

It should be understood that the example computing platform 600 is one example of a computing platform that may be used with the examples described herein. Numerous other arrangements are possible and contemplated herein. For instance, in other examples, the example computing platform 600 may include additional components not pictured and/or more or less of the pictured components.

Figure 7:
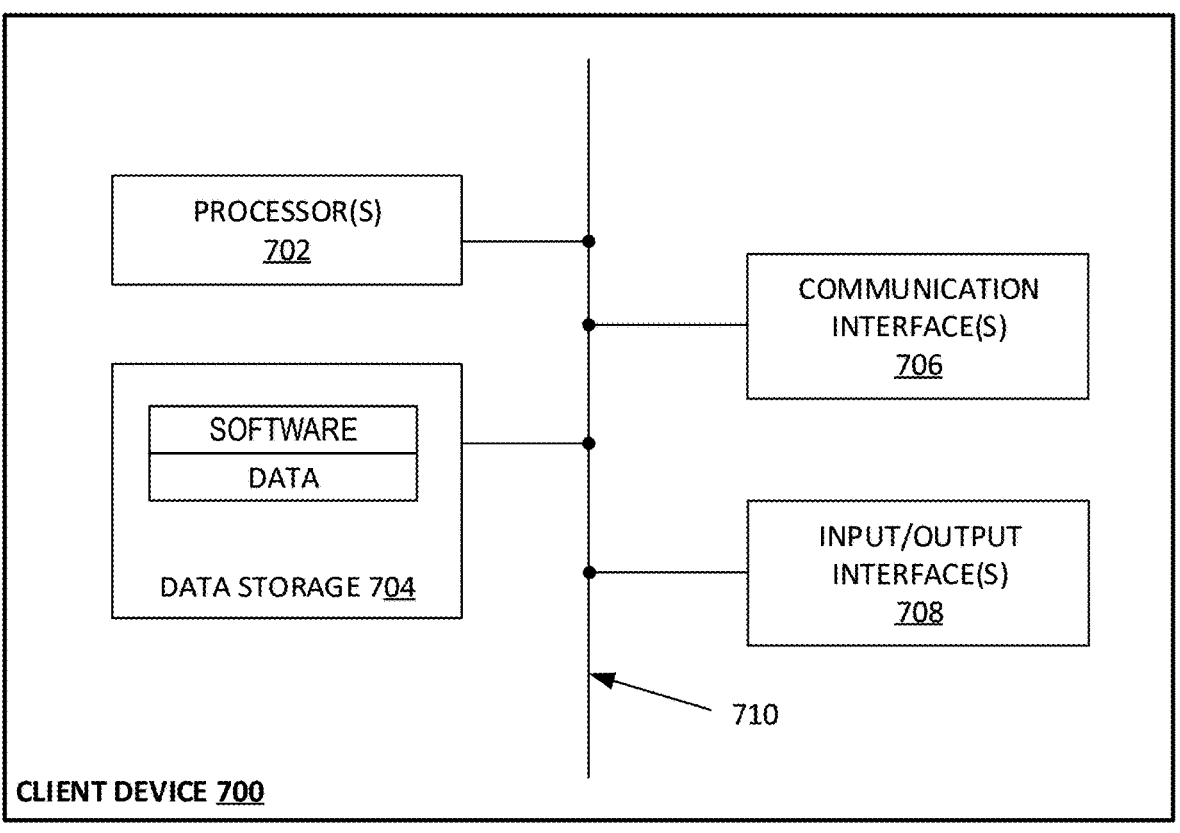
FIG. 7 illustrates a simplified block diagram that illustrates some structural components of an example client device that may be configured to carry out any of the various functions disclosed herein.

Turning next to FIG. 7, a simplified block diagram is provided to illustrate some structural components that may be included in an example client device 700 that may be configured to perform some of the client-side functions disclosed herein. At a high level, the example client device 700 may include one or more processors 702, data storage 704, one or more communication interfaces 706, and an I/O interface 708, each of which may be communicatively linked by a communication link 710 that may take the form a system bus and/or some other connection mechanism. Each of these components may take various forms.

For instance, the one or more processors 702 of the example client device 700 may comprise one or more processor components, such as one or more CPUs, GPUs, ASICs, DSPs, and/or programmable logic devices such as FPGAs, among other possible types of processing components.

In turn, the data storage 704 of the example client device 700 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 7, the data storage 704 may be capable of storing both (i) program instructions that are executable by the one or more processors 702 of the example client device 800 such that the example client device 700 is configured to perform any of the various functions disclosed herein (including but not limited to any of the client-side functions discussed above), and (ii) data that may be received, derived, or otherwise stored by the example client device 700.

The one or more communication interfaces 706 may comprise one or more interfaces that facilitate communication between the example client device 700 and other systems or devices, where each such interface may be wired and/or wireless and may communicate according to any of various communication protocols. As examples, the one or more communication interfaces 706 may include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 708 may generally take the form of (i) one or more input interfaces that are configured to receive and/or capture information at the example client device 700 and (ii) one or more output interfaces that are configured to output information from the example client device 700 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of the I/O interface 708 may include or provide connectivity to output components such as a display screen and/or an audio speaker, among other possibilities. In certain embodiments, a display screen may be used to view an interface via one or more of extended reality, augmented reality, and virtual reality technology.

It should be understood that the example client device 700 is one example of a client device that may be used with the examples described herein. Numerous other arrangements are possible and contemplated herein. For instance, in other examples, the example client device 700 may include additional components not pictured and/or more or fewer of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or."

Further, to the extent that examples described herein involve operations performed or initiated by actors, such as "humans," "developers," "users" or other entities, this is for purposes of example and explanation only. The claims should not be construed as requiring action by such actors unless explicitly recited in the claim language.

I claim:

1. A computing platform comprising:

at least one processor;

at least one non-transitory computer-readable medium; and program instructions stored on the at least one non-transitory computer-readable medium that, when executed by the at least one processor, cause the computing platform to:

for a deep-learning artificial intelligence (AI) model:

determine a baseline group-specific fairness metric for each individual demographic group of a plurality of demographic groups that quantifies a performance of the deep-learning AI model in predicting outcomes for the individual demographic group;

determine fairness-importance scores for at least a subset of the deep-learning AI model's parameters by, for each respective parameter in the subset:

perturbing the respective parameter;

determining, for each individual demographic group of the plurality of demographic groups, a group-specific fairness-metric differential that quantifies an extent to which perturbing the respective parameter changes the performance of the deep-learning AI model in predicting outcomes for the individual demographic group relative to the baseline group-specific fairness metric for the individual demographic group; and determining a respective fairness-importance score of the respective parameter based on the group-specific fairness-metric differentials that are determined for the individual demographic groups of the plurality of demographic groups;

carry out an optimization process that produces and evaluates different quantized versions of the deep-learning AI model that each differ from one another with respect to one or both of (i) which group of the deep-learning AI model's parameters have their precision frozen during quantization, wherein the group of the deep-learning AI model's parameters that have their precision frozen during quantization is determined based on the fairness-importance scores that are determined for at least the subset of the deep-learning AI model's parameters, and (ii) which quantization strategy was utilized to reduce a precision of the deep-learning AI model's parameters that did not have their precision frozen during quantization;

based on the optimization process, select a given quantized version of the deep-learning AI model for deployment;

fine-tune the given quantized version of the deep-learning AI model; and after fine-tuning the given quantized version of the deep-learning AI model, deploy the given quantized version of the deep-learning AI model.

2. The computing platform of claim 1, further comprising program instructions stored on the at least one non-transitory computer-readable medium that, when executed by the at least one processor, cause the computing platform to:

receive data defining configuration settings that are input via a given client device associated with a user, wherein the configuration settings define strategies for one or more of (i) carrying out the optimization process, or (ii) fine-tuning the given quantized version of the deep-learning AI model.

3. The computing platform of claim 2, wherein the configuration settings comprise one or more of (i) group-level fairness settings that comprise constraints for maintaining a group-specific fairness metric above a given threshold for each of the plurality of demographic groups, (ii) fairness-analysis settings for establishing the baseline group-specific fairness metric for each of the plurality of demographic groups, (iii) quantization settings, or (iv) fine-tuning settings.

4. The computing platform of claim 1, wherein:

the baseline group-specific fairness metric for each individual demographic group of the plurality of demographic groups comprises a true positive prediction rate, false positive prediction rate, or a false negative prediction rate; and for each respective parameter in the subset of the deep-learning AI model's parameters, determining the respective fairness-importance score of the respective parameter based on the group-specific fairness-metric differentials that are determined for the individual demographic groups of the plurality of demographic groups comprises determining a maximum absolute difference in group-specific fairness-metric differentials between any two of the plurality of demographic groups.

5. The computing platform of claim 1:

wherein the different quantized versions of the deep-learning AI model that are produced and evaluated comprise a first quantized version of the deep-learning AI model, and a second quantized version of the deep-learning AI model; and wherein selecting the given quantized version of the deep-learning AI model for deployment comprises:

determining whether the first quantized version of the deep-learning AI model satisfies a set of one or more optimization constraints that is applicable to any quantized version of the deep-learning AI model;

based on the determination that the first quantized version of the deep-learning AI model satisfies the set of one or more optimization constraints, determining an objective value for the first quantized version of the deep-learning AI model;

determining whether the second quantized version of the deep-learning AI model satisfies the set of one or more optimization constraints; and based on the determination that the second quantized version of the deep-learning AI model satisfies the set of one or more optimization constraints:

determining an objective value for the second quantized version of the deep-learning AI model;

comparing the objective value for the first quantized version of the deep-learning AI model with the objective value for the second quantized version of the deep-learning AI model; and based on the comparison, retaining one of the first or second quantized version of the deep-learning AI model with a better objective value and discarding the other, wherein the objective value for each quantized version of the deep-learning AI model is determined based at least on (i) a prediction error of the quantized version of the deep-learning AI model, (ii) a fairness error of the quantized version of the deep-learning AI model, and (iii) a fairness-balancing coefficient applied to the fairness error.

6. The computing platform of claim 5, wherein the set of one or more optimization constraints for any quantized version of the deep-learning AI model comprises a model size constraint, a predictive accuracy constraint, or a prediction time constraint.

7. The computing platform of claim 5, wherein selecting the given quantized version of the deep-learning AI model for deployment further comprises:

based on the determination that the second quantized version of the deep-learning AI model does not satisfy the set of one or more optimization constraints, discarding the second quantized version of the deep-learning AI model.

8. The computing platform of claim 1, wherein fine-tuning the given quantized version of the deep-learning AI model comprises:

applying a Low-Rank Adaptation (LoRA) technique to fine-tune the given quantized version of the deep-learning AI model.

9. The computing platform of claim 8, wherein applying the LoRA technique to fine-tune the given quantized version of the deep-learning AI model comprises:

inserting one or more low-rank matrices into selected layers of the given quantized version of the deep-learning AI model; and updating the one or more low-rank matrices while keeping quantized parameters of the given quantized version of the deep-learning AI model frozen to minimize an overall loss function comprising (i) a task loss component that measures predictive accuracy of the given quantized version of the deep-learning AI model, (ii) a penalty loss component that measures the extent to which the given quantized version of the deep-learning AI model violates fairness objectives aimed at reducing disparities across the plurality of demographic groups, and (iii) a penalty coefficient applied to the penalty loss component.

10. The computing platform of claim 1, wherein the deep-learning AI model is configured to generate predictions related to whether a financial institution should extend a particular type of service to individuals from the plurality of demographic groups, wherein the particular type of service comprises one of a loan, a credit card account, a bank account, or a mortgage service.

11. The computing platform of claim 1, further comprising program instructions stored on the at least one non-transitory computer-readable medium that, when executed by the at least one processor, cause the computing platform to:

after deploying the given quantized version of the deep-learning AI model, determine a group-specific fairness metric for each individual demographic group of the plurality of demographic groups based on predictions output by the given quantized version of the deep-learning AI model.

12. The computing platform of claim 11, further comprising program instructions stored on the at least one non-transitory computer-readable medium that, when executed by the at least one processor, cause the computing platform to:

generate an alert if a given group-specific fairness metric determined for a given demographic group in the plurality of demographic groups violates a predefined threshold.

13. A non-transitory computer-readable medium, wherein the non-transitory computer-readable medium is provisioned with program instructions that, when executed by at least one processor, cause a computing platform to:

for a deep-learning artificial intelligence (AI) model:

determine a baseline group-specific fairness metric for each individual demographic group of a plurality of demographic groups that quantifies a performance of the deep-learning AI model in predicting outcomes for the individual demographic group;

determine fairness-importance scores for at least a subset of the deep-learning AI model's parameters by, for each respective parameter in the subset:

perturbing the respective parameter;

determining, for each individual demographic group of the plurality of demographic groups, a group-specific fairness-metric differential that quantifies an extent to which perturbing the respective parameter changes the performance of the deep-learning AI model in predicting outcomes for the individual demographic group relative to the baseline group-specific fairness metric for the individual demographic group; and determining a respective fairness-importance score of the respective parameter based on the group-specific fairness-metric differentials that are determined for the individual demographic groups of the plurality of demographic groups;

carry out an optimization process that produces and evaluates different quantized versions of the deep-learning AI model that each differ from one another with respect to one or both of (i) which group of the deep-learning AI model's parameters have their precision frozen during quantization, wherein the group of the deep-learning AI model's parameters that have their precision frozen during quantization is determined based on the fairness-importance scores that are determined for at least the subset of the deep-learning AI model's parameters, and (ii) which quantization strategy was utilized to reduce a precision of the deep-learning AI model's parameters that did not have their precision frozen during quantization;

based on the optimization process, select a given quantized version of the deep-learning AI model for deployment;

fine-tune the given quantized version of the deep-learning AI model; and after fine-tuning the given quantized version of the deep-learning AI model, deploy the given quantized version of the deep-learning AI model.

14. The non-transitory computer-readable medium of claim 13, wherein the non-transitory computer-readable medium is also provisioned with program instructions that, when executed by the at least one processor, cause the computing platform to:

receive data defining configuration settings that are input via a given client device associated with a user, wherein the configuration settings define strategies for one or more of (i) carrying out the optimization process, or (ii) fine-tuning the given quantized version of the deep-learning AI model.

15. The non-transitory computer-readable medium of claim 13, wherein:

the baseline group-specific fairness metric for each individual demographic group of the plurality of demographic groups comprises a true positive prediction rate, false positive prediction rate, or a false negative prediction rate; and for each respective parameter in the subset of the deep-learning AI model's parameters, determining the respective fairness-importance score of the respective parameter based on the group-specific fairness-metric differentials that are determined for the individual demographic groups of the plurality of demographic groups comprises determining a maximum absolute difference in group-specific fairness-metric differentials between any two of the plurality of demographic groups.

16. The non-transitory computer-readable medium of claim 13:

wherein the different quantized versions of the deep-learning AI model that are produced and evaluated comprise a first quantized version of the deep-learning AI model, and a second quantized version of the deep-learning AI model; and wherein selecting the given quantized version of the deep-learning AI model for deployment comprises:

determining whether the first quantized version of the deep-learning AI model satisfies a set of one or more optimization constraints that is applicable to any quantized version of the deep-learning AI model;

based on the determination that the first quantized version of the deep-learning AI model satisfies the set of one or more optimization constraints, determining an objective value for the first quantized version of the deep-learning AI model;

determining whether the second quantized version of the deep-learning AI model satisfies the set of one or more optimization constraints; and based on the determination that the second quantized version of the deep-learning AI model satisfies the set of one or more optimization constraints:

determining an objective value for the second quantized version of the deep-learning AI model;

comparing the objective value for the first quantized version of the deep-learning AI model with the objective value for the second quantized version of the deep-learning AI model; and based on the comparison, retaining one of the first or second quantized version of the deep-learning AI model with a better objective value and discarding the other, wherein the objective value for each quantized version of the deep-learning AI model is determined based at least on (i) a prediction error of the quantized version of the deep-learning AI model, (ii) a fairness error of the quantized version of the deep-learning AI model, and (iii) a fairness-balancing coefficient applied to the fairness error.

17. The non-transitory computer-readable medium of claim 16, wherein selecting the given quantized version of the deep-learning AI model for deployment further comprises:

based on the determination that the second quantized version of the deep-learning AI model does not satisfy the set of one or more optimization constraints, discarding the second quantized version of the deep-learning AI model.

18. The non-transitory computer-readable medium of claim 13, wherein fine-tuning the given quantized version of the deep-learning AI model comprises:

applying a Low-Rank Adaptation (LoRA) technique to fine-tune the given quantized version of the deep-learning AI model.

19. The non-transitory computer-readable medium of claim 13, wherein the deep-learning AI model is configured to generate predictions related to whether a financial institution should extend a particular type of service to individuals from the plurality of demographic groups, wherein the particular type of service comprises one of a loan, a credit card account, a bank account, or a mortgage service.

20. A method carried out by a computing platform, the method comprising:

for a deep-learning artificial intelligence (AI) model:

determining a baseline group-specific fairness metric for each individual demographic group of a plurality of demographic groups that quantifies a performance of the deep-learning AI model in predicting outcomes for the individual demographic group;

determining fairness-importance scores for at least a subset of the deep-learning AI model's parameters by, for each respective parameter in the subset:

perturbing the respective parameter;

determining, for each individual demographic group of the plurality of demographic groups, a group-specific fairness-metric differential that quantifies an extent to which perturbing the respective parameter changes the performance of the deep-learning AI model in predicting outcomes for the individual demographic group relative to the baseline group-specific fairness metric for the individual demographic group; and determining a respective fairness-importance score of the respective parameter based on the group-specific fairness-metric differentials that are determined for the individual demographic groups of the plurality of demographic groups;

carrying out an optimization process that produces and evaluates different quantized versions of the deep-learning AI model that each differ from one another with respect to one or both of (i) which group of the deep-learning AI model's parameters have their precision frozen during quantization, wherein the group of the deep-learning AI model's parameters that have their precision frozen during quantization is determined based on the fairness-importance scores that are determined for at least the subset of the deep-learning AI model's parameters, and (ii) which quantization strategy was utilized to reduce a precision of the deep-learning AI model's parameters that did not have their precision frozen during quantization;

based on the optimization process, selecting a given quantized version of the deep-learning AI model for deployment;

fine-tuning the given quantized version of the deep-learning AI model; and after fine-tuning the given quantized version of the deep-learning AI model, deploying the given quantized version of the deep-learning AI model.

* * * * *